United States Patent
Ichiba

(10) Patent No.: US 12,236,520 B2
(45) Date of Patent: Feb. 25, 2025

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Ryota Ichiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 17/988,790

(22) Filed: Nov. 17, 2022

(65) Prior Publication Data

US 2023/0196657 A1 Jun. 22, 2023

(30) Foreign Application Priority Data

Dec. 20, 2021 (JP) .................. 2021-206264

(51) Int. Cl.
| | |
|---|---|
| G06T 15/20 | (2011.01) |
| G01J 1/44 | (2006.01) |
| G06F 3/01 | (2006.01) |
| G06F 3/147 | (2006.01) |
| G06T 15/50 | (2011.01) |

(Continued)

(52) U.S. Cl.
CPC .............. *G06T 15/20* (2013.01); *G06F 3/013* (2013.01); *G06T 15/506* (2013.01)

(58) Field of Classification Search
CPC ....... G06T 15/20; G06T 15/50; G06T 15/506; G06T 7/40; G06T 7/70; G06T 19/20; G06T 5/92; G06T 5/50; G06T 5/77; G06T 2207/20081; G06T 2207/10152; G06V 10/60; G06V 20/10; G06V 40/171; G06N 21/00; G06N 21/55; G06N 21/57; G06N 21/4738; G06N 21/27; G06F 3/013; G06F 3/147; G01J 1/44; G01J 3/50; G01S 3/783; H04N 1/60; H04N 5/57–58;

(Continued)

(56) References Cited

U.S. PATENT DOCUMENTS

| | | | |
|---|---|---|---|
| 6,597,380 B1 | 7/2003 | Wang et al. | |
| 2008/0245979 A1* | 10/2008 | Banton | G01N 21/57 250/559.4 |

(Continued)

FOREIGN PATENT DOCUMENTS

| | | | | |
|---|---|---|---|---|
| JP | H11-265462 A | 9/1999 | | |
| WO | WO-2015182134 A1 * | 12/2015 | ............. | G06T 15/50 |

OTHER PUBLICATIONS

Improved setting of virtual illumination environment. (Year: 2015).*

*Primary Examiner* — Wesner Sajous
(74) *Attorney, Agent, or Firm* — Venable LLP

(57) ABSTRACT

An information processing apparatus comprising: an appearance information obtainment unit configured to obtain appearance information indicating an appearance of a target object; an illumination information obtainment unit configured to obtain illumination information for illuminating the target object; a direction calculation unit configured to calculate, based on the appearance information and the illumination information, an observation direction for observing the appearance of the target object; and a rendering unit configured to render information indicating the observation direction.

17 Claims, 16 Drawing Sheets

(51) Int. Cl.
*G06V 10/60* (2022.01)
*G06V 20/10* (2022.01)
*H04N 9/64* (2023.01)

(58) Field of Classification Search
CPC .............. H04N 9/64–77; G09G 5/02; G09G 2320/06–0666; G09G 2320/0271–0276
See application file for complete search history.

(56) References Cited

U.S. PATENT DOCUMENTS

| | | | |
|---|---|---|---|
| 2015/0162372 A1* | 6/2015 | Yorimoto | H01L 27/14643 250/208.1 |
| 2016/0258865 A1* | 9/2016 | Kawano | G01N 21/55 |
| 2017/0082720 A1* | 3/2017 | Robert | G01N 21/4738 |
| 2019/0120764 A1* | 4/2019 | Ishii | G01N 21/55 |
| 2019/0129674 A1* | 5/2019 | Kuwada | G06T 15/04 |
| 2022/0189137 A1* | 6/2022 | Inaba | H04N 19/80 |
| 2023/0131109 A1* | 4/2023 | Meier | G06T 7/75 382/103 |

* cited by examiner

FIG. 1
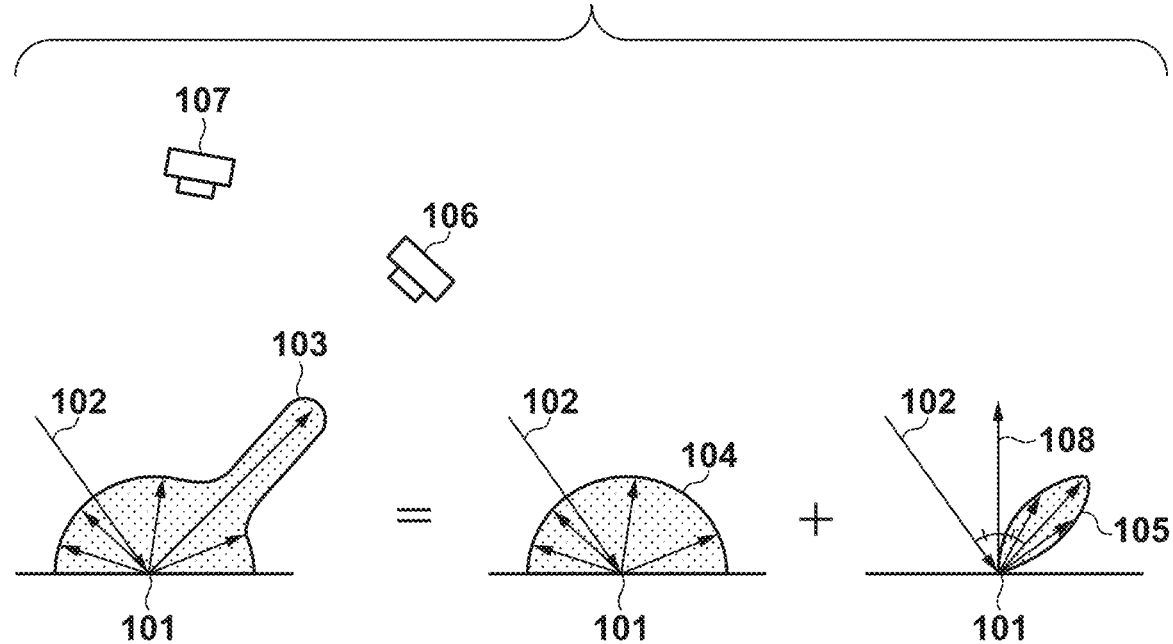
FIG. 2A  FIG. 2B  FIG. 2C
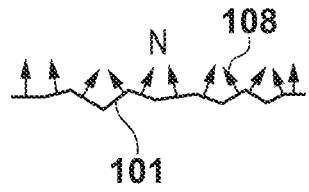 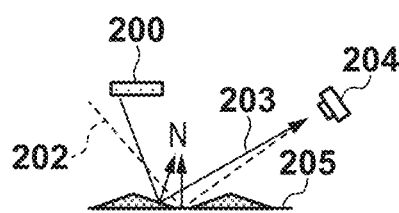 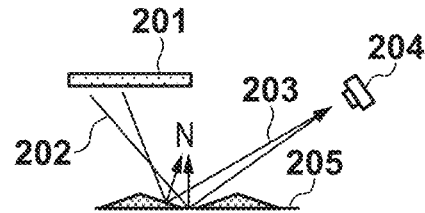

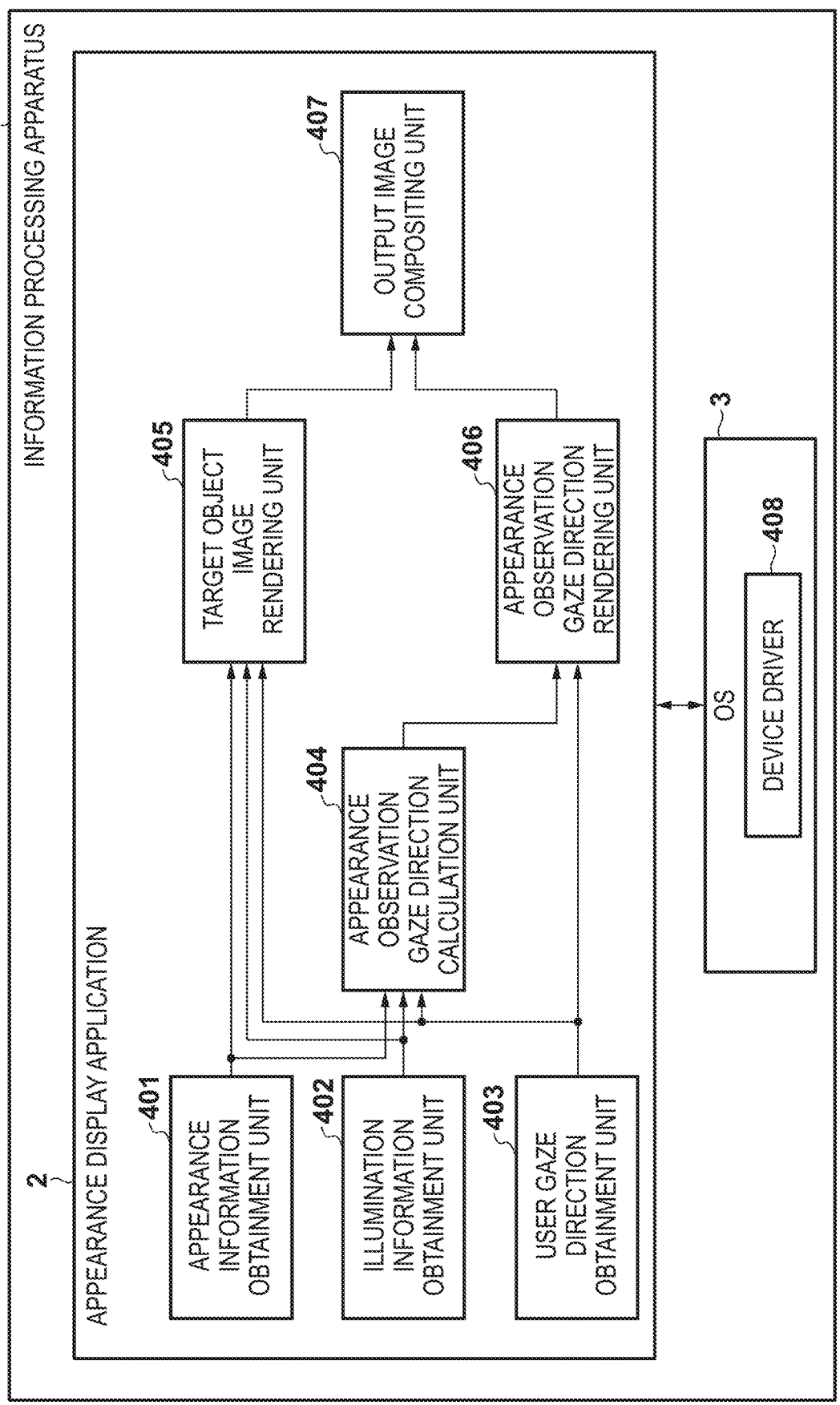

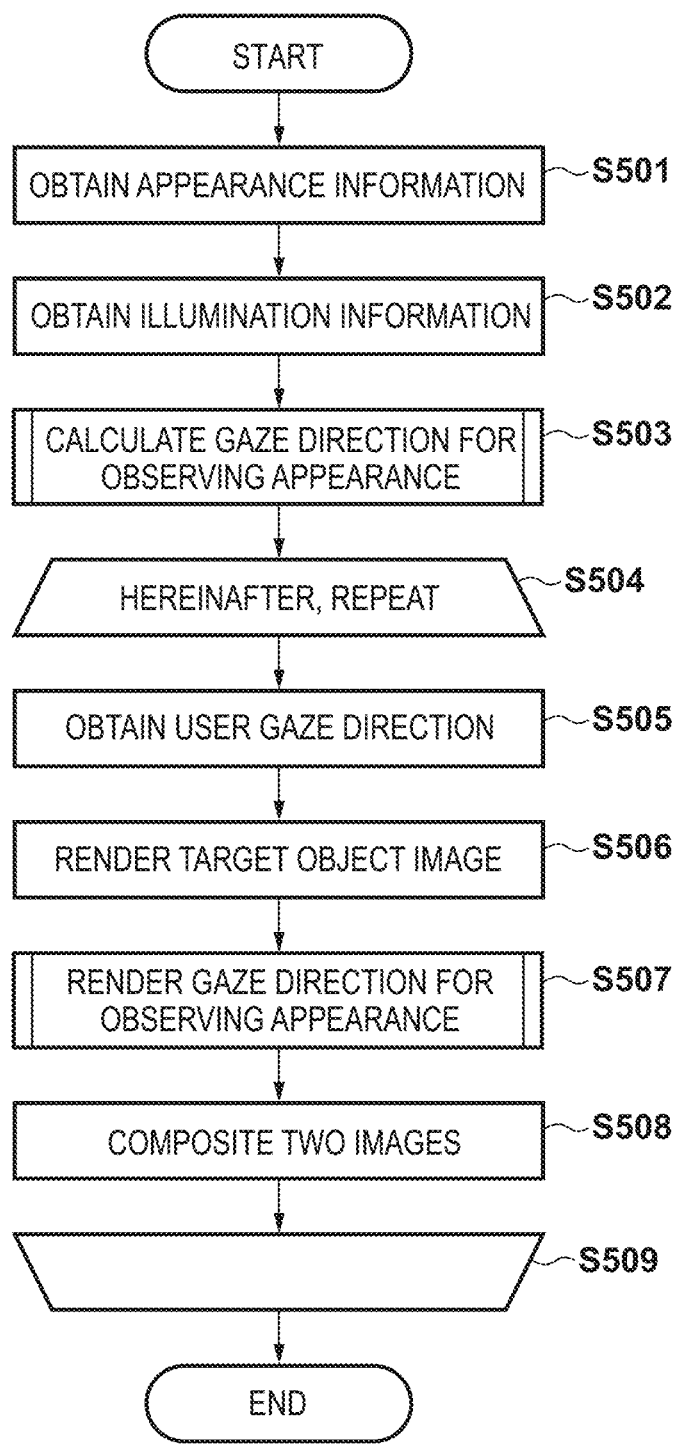

INFORMATION PROCESSING APPARATUS, METHOD FOR CONTROLLING INFORMATION PROCESSING APPARATUS, AND STORAGE MEDIUM

BACKGROUND OF THE INVENTION

Field of the Invention

The present invention relates to an information processing apparatus, a method for controlling the information processing apparatus, and a storage medium.

Description of the Related Art

Recently, with improvements in CG and imaging techniques and computer performance, it has become possible to express an appearance of an object (target object) on an information terminal. In order to increase product appeal, especially in shopping on the Internet, there is an increasing demand for a user to confirm appearances of products in various indoor and outdoor surrounding environments.

In a method described in Japanese Patent Laid-Open No. H11-265462, a content creator manually sets in advance a gaze direction and presents it to the user. By presenting to the user a gaze direction in which an appearance of a product, such as glossiness or color, manifests easily, the user can effectively confirm the appearance of the product without the work of changing their gaze direction in various ways for observation.

However, in a technique described in Japanese Patent Laid-Open No. H11-265462, a content creator needs to manually specify a gaze direction that is suitable for observing an appearance of a target object. Generally, when a surrounding environment changes, a gaze direction that is suitable for observing an appearance also changes. Therefore, there is a problem that in cases where a surrounding environment has changed or the like, it is difficult to present to the user a gaze direction that is suitable for observing appearance.

The present invention has been made in view of the above problem and provides a technique for ascertaining a gaze direction that is suitable for observing an appearance of a target object.

SUMMARY OF THE INVENTION

According to one aspect of the present invention, there is provided an information processing apparatus comprising: an appearance information obtainment unit configured to obtain appearance information indicating an appearance of a target object; an illumination information obtainment unit configured to obtain illumination information for illuminating the target object; a direction calculation unit configured to calculate, based on the appearance information and the illumination information, an observation direction for observing the appearance of the target object; and a rendering unit configured to render information indicating the observation direction.

Further features of the present invention will become apparent from the following description of exemplary embodiments (with reference to the attached drawings).

BRIEF DESCRIPTION OF THE DRAWINGS

FIG. 1 is a diagram for explaining color and glossiness.
FIGS. 2A, 2B, 2C, 2D, 2E, 2F, and 2G are diagrams for explaining unevenness.
FIG. 5 is a diagram illustrating an example of a functional configuration of the information processing apparatus.
FIG. 6 is a flowchart of processing to be performed in the information processing apparatus.

DESCRIPTION OF THE EMBODIMENTS

Figure 2D:
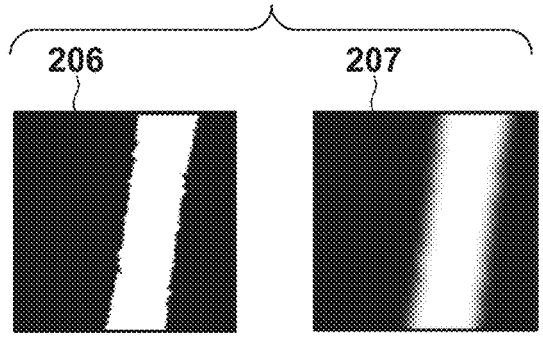

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, a description will be given for an example of calculating from a surrounding environment (illumination environment) a gaze direction that is suitable for observing an appearance of an object (target object), which is displayed on a display screen, and presenting the gaze direction. The present embodiment makes it possible to confirm appearance in the current illumination environment as if a target object is in that position. For example, there are cases where when viewing a fabric product while shopping on the Internet, images of that fabric product is displayed on a tablet information terminal or the like. At that time, the present embodiment makes it possible, while expressing how that product looks in an illumination environment of a room or the like where the user is, to ascertain from which direction with respect to the display screen the appearance will be easily observed.

Before a description of the present embodiment is given, a description will be given of an example of elements which make up an appearance, and of a gaze direction that is suitable for observing the elements.

<Description of Elements of Appearance>

As elements of an appearance of an object (a material or target object), there are, for example, color, glossiness, and unevenness. Color can be perceived from a diffuse reflection component of a material, and glossiness can be perceived from a specular reflection component of a material.

FIG. 1 is a diagram for explaining diffuse reflection and specular reflection. Light 102 that is incident on a material surface 101 is reflected in accordance with an intensity distribution 103, which depends on an angle of observation. The reflected light intensity distribution 103 can be represented as a sum of a diffuse reflection component 104 caused by diffuse reflection in a material and a specular reflection component 105 caused by reflection on a material surface. The specular reflection component 105 has a peak in an angle region in which an angle of reflection is equal to an angle of incidence. Therefore, at a gaze direction position 106, which is in a specular reflection direction of the incident light 102, a larger proportion of the specular reflection component 105 is observed than in another gaze direction; accordingly, the gaze direction position 106 is suitable for observing a glossiness of the material. Similarly, at a gaze direction position 107, which is away from the specular reflection direction of the incident light 102, the diffuse reflection component is observed more predominantly than the specular reflection component; accordingly, the gaze direction position 107 is suitable for observing a color of the material.

Unevenness can be perceived from changes in views of diffuse reflection and specular reflection, which correspond to fine unevenness on a material surface. FIG. 2A is a diagram illustrating a material surface with fine unevenness. There is fine unevenness on the material surface 101, and a normal direction 108 changes depending on the location. In a case of a material whose specular reflection intensity is stronger than diffuse reflection intensity and whose change in reflected light intensity near the specular reflection direction is large, a fine change in the normal of a material surface can be perceived as a change in a specular reflection component. A description will be given below that in such a case, unevenness can be effectively observed when observed from a specular reflection direction of a small light source.

FIGS. 2B and 2C are diagrams representing specular reflection on two planes whose normal directions N differ on a material surface. Regarding two rays, a ray 202 and a ray 203 when specularly reflected light from two planes whose normal directions differ on a material surface 205 is observed at a gaze direction position 204, when a light source 200 illuminates the surface, the ray 202 is not observed at the gaze direction position 204 due to its starting point being in a region where there is no light source. Therefore, a difference between the normals of the two planes is perceived as a luminance difference due to the presence or absence of specularly reflected light. Meanwhile, when a light source 201, which is larger than the light source 200, illuminates the surface, the ray 202 and the ray 203 are both observed; accordingly, it is difficult to distinguish the difference between the normals of the two planes by specularly reflected light. Therefore, in a case of a material whose specular reflection intensity is strong, unevenness can be effectively observed by observing from a specular reflection direction of a small light source.

In addition, unevenness can be effectively observed by observing from a specular reflection direction of a light source whose edge is sharp. A light source whose edge is sharp is, for example, a light source such as a fluorescent lamp and a spotlight, and a light source whose edge is not sharp is, for example, a light source, such as outside light from a window covered with a curtain. FIG. 2D illustrates images in which a material has been observed from a specular reflection direction of a light source whose edge is sharp and a specular reflection direction of a light source whose edge is not sharp, respectively. In an image 206, which has been observed from a specular reflection direction of a light source whose edge is sharp, since irregularities on the edges of a specular reflection image of the light source reflects fine changes in the normal of a material surface, it is possible to visually recognize an unevenness of a material. Meanwhile, in an image 207, which has been observed from a specular reflection direction of a light source whose edge is not sharp, since a luminance difference is small on the edges of a regular reflection image of a light source, it is difficult to visually recognize unevenness on a surface from the reflection image.

In a case of a material whose specular reflection intensity is weaker than diffuse reflection intensity and whose change in reflected light intensity near the specularly reflected light is small, a fine change in the normal of a material surface can be perceived as a change in a diffuse reflection intensity. A description will be given below that in such a case, unevenness can be effectively observed by observing from a direction that is perpendicular to the ray.

Figure 2E:
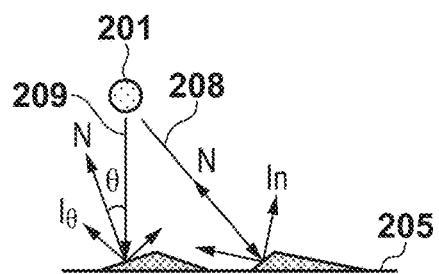

FIG. 2E is a diagram illustrating a state in which light from a light source incident on an uneven material surface is diffusely reflected. FIG. 2E illustrates a ray 208 that is incident on a material's plane whose normal is parallel to a light source direction from the light source 201, and a ray 209 that is incident on a plane whose normal forms an angle θ with the light source direction. Assuming that diffuse reflection intensities are In and Iθ, respectively, the relationship between these two intensities is approximately expressed by Lambert's cosine law, which is the following equation.

[EQUATION 1]

$$I_\theta = I_n \cos \theta \qquad (1)$$

Differentiating Equation 1 by θ results in the following equation.

[EQUATION 2]

$$\frac{dI_\theta}{d\theta} = -I_n \sin\theta \qquad (2)$$

Figure 2F:
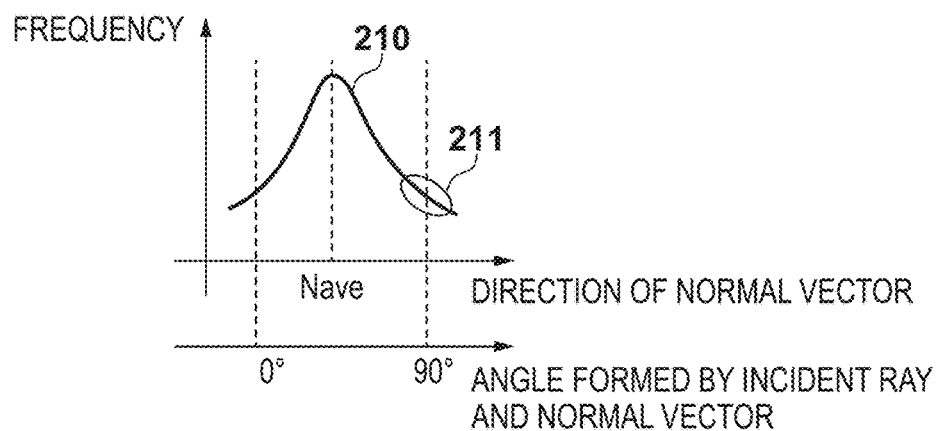

A region of θ in which the diffuse reflection intensity changes the most is around where θ is 90 degrees. FIG. 2F illustrates a distribution of normal directions of a material. The normals of a material surface have a distribution 210, which is centered on a mean normal direction Nave. In the distribution 210, planes of a region 211 in which angles that are formed by an incident ray and a normal vector is around 90 degrees have the largest luminance change.

Figure 2G:
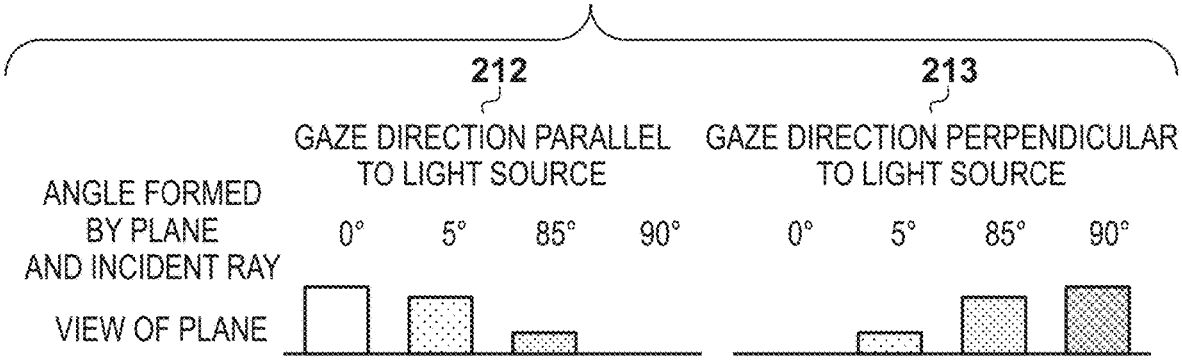

To observe a plane whose angle between an incident ray and a normal vector is around 90 degrees, the plane is observed from a direction that is perpendicular to a light source. FIG. 2G is a diagram illustrating views of a plane whose angles formed by the normal and the incident ray are 0 degree, 5 degrees, 85 degrees, and 90 degrees when the plane is viewed from two directions, which are a gaze direction that is parallel to the incident ray and a gaze direction that is perpendicular to the incident light source. In a view 212 from the gaze direction that is parallel to the incident ray, the plane whose angle formed by the normal and the incident ray is small appears large. Meanwhile, in a view 213 from the gaze direction that is perpendicular to the incident ray, the plane whose angle formed by the normal and the incident ray is close to 90 degrees appears large. Furthermore, since the diffuse reflection intensity greatly varies with a change in the normal where an angle formed by the normal and the incident ray is around 90 degrees, a fine change in the normal of a material surface can be observed as a luminance change. Therefore, in a case where the specular reflection intensity is weak, unevenness can be effectively observed by observing from a direction that is perpendicular to the ray.

In the present embodiment, a tablet-type information terminal is used as an information processing apparatus; the terminal calculates and presents gaze directions that are suitable for observing color and glossiness among the above-described elements of appearance. An application for observing appearance, which displays on a display of the tablet-type information terminal whose position and posture is fixed a plane model in which appearance information has been mapped as a target object and which dynamically changes a look of the target object in accordance with a change of the user's gaze, is assumed.

<Use Case>

A description will be given for an example of a use case where the tablet-type information terminal according to the present embodiment is used. For example, a case where when viewing and confirming a product exhibited on the Web, such as in shopping on the Internet, one wants to confirm an appearance of that product is assumed. When a fabric, as an example of a product, is being viewed, in response to the user's selection of that fabric product, the tablet-type information terminal obtains appearance information of the fabric that has been stored in advance on the Web.

Next, illumination information of the user's room is obtained to ascertain how the fabric will be observed under an illumination environment, such as that of the room that the user is currently in. It is thought that the illumination information is obtained, for example, by the user capturing the entire room while holding the tablet-type information terminal at a center position of the room and rotating. Alternatively, a configuration may be taken so as to obtain the illumination information using an omnidirectional camera or the like disposed at the center position of the room.

When the user displays an image of the fabric on the tablet-type information terminal in the room, the look of the fabric is changed in accordance with the position and posture of the tablet-type information terminal and the user's gaze direction. When an image of the fabric is displayed on the tablet-type information terminal, the situation will be such that it is as though the fabric is being held at the position of the tablet-type information terminal, and the look of the fabric at that time will be displayed. At this time, by displaying an observation direction that is suitable for observing an appearance, it is possible for the user to easily ascertain that the user's current gaze direction is misaligned with the observation direction that is suitable for observing appearance. Therefore, it becomes easy for the user to change the user's gaze direction to get closer to the observation direction that is suitable for observing the appearance while keeping the holding position of the tablet-type information terminal fixed (that is, while not moving the spatial position and posture of the tablet-type information terminal). For example, when the fabric is initially observed head on, facing directly at the screen of the tablet-type information terminal, it can be ascertained that when observed from a slightly right diagonal direction, the direction will be the observation direction that is suitable for observing the appearance. The user changes their gaze direction so as to view the screen of the tablet-type information terminal from a diagonal direction by shifting the position of their head to the right; this changes the look of the fabric image, thereby making it easier to observe its appearance.

<Hardware Configuration>

Figure 3:
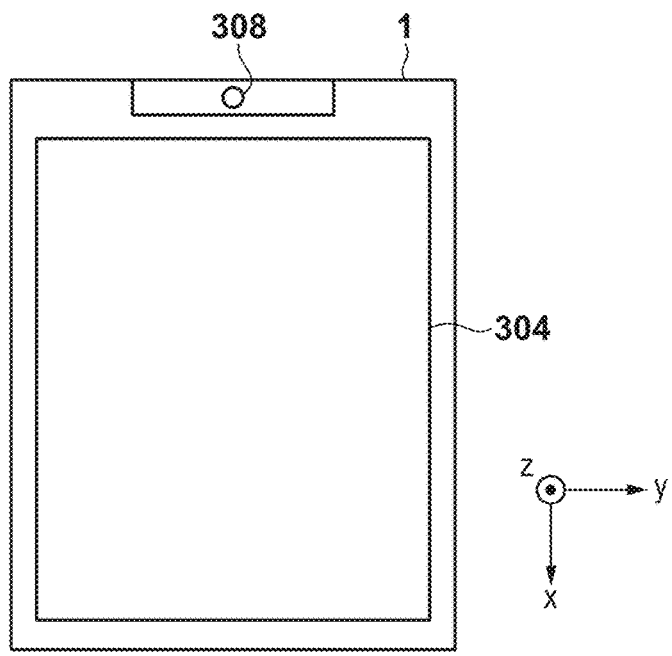
FIG. 3 is a diagram illustrating an example of an appearance of hardware of an information processing apparatus.

FIG. 3 is an external view of an information processing apparatus described in the present embodiment. A reference numeral 1 is an information processing apparatus main body. The information processing apparatus 1 includes a display 304 provided with a touch panel function configured by a panel, such as a liquid crystal or an organic EL panel, and a camera 308 that is present on the same surface as the display 304. The camera 308 obtains a two-dimensional 8-bit RGB image of 1280×720 pixels, for example, by a CMOS sensor.

Figure 4:
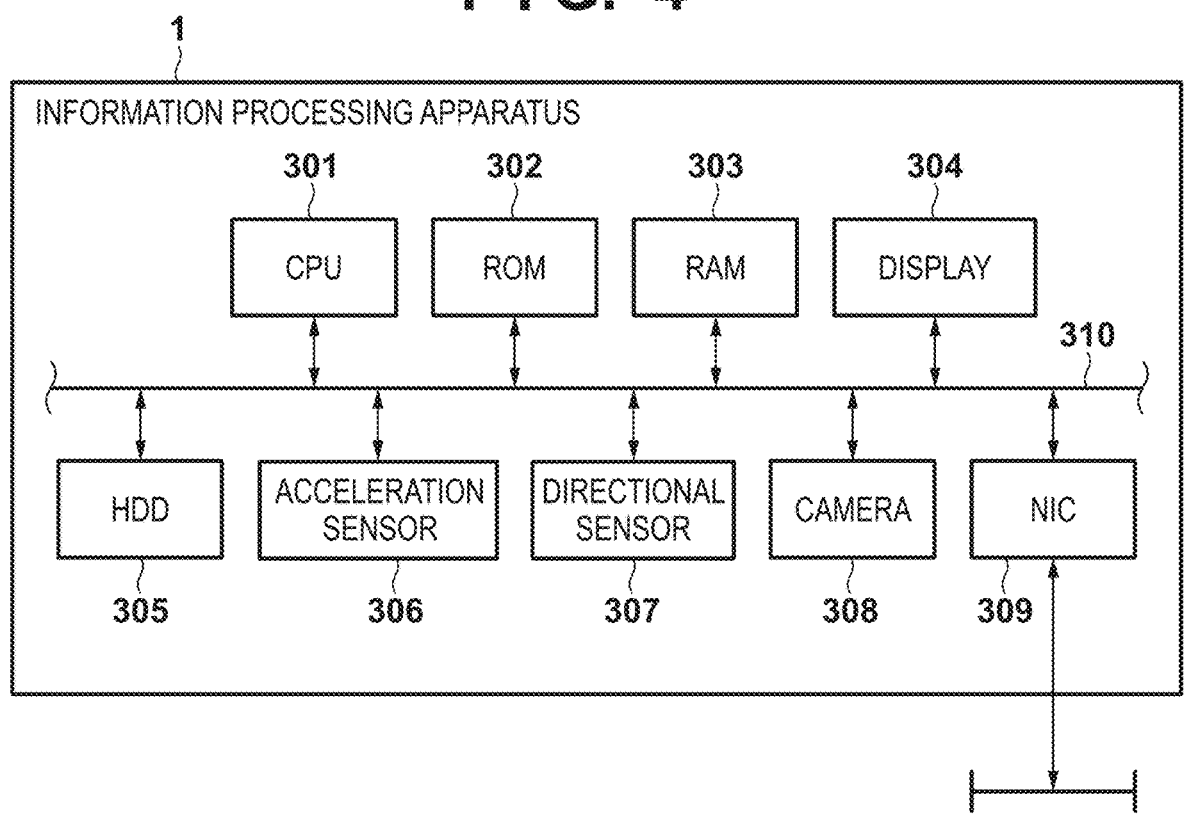
FIG. 4 is a diagram illustrating an example of a hardware configuration of the information processing apparatus.

FIG. 4 is a block diagram illustrating a hardware configuration of the information processing apparatus 1. In addition to the above-described display 304 and camera 308, the information processing apparatus 1 includes a central processing unit (CPU) 301, a read-only memory (ROM) 302, a random access memory (RAM) 303, and a hard disk drive (HDD) 305. It also includes an acceleration sensor 306, a directional sensor 307, and a network interface card (NIC) 309.

The CPU 301 executes an operating system (OS) and various programs stored in the ROM 302, the HDD 305, and the like using the RAM 303 as a work memory. The CPU 301 controls the respective components via a system bus 310. The NIC 309 connects to the Internet and inputs and outputs information to and from an external apparatus. The CPU 301 uses the HDD 305, the ROM 302, and a storage medium on the Internet as data storage regions. The CPU 301 also displays a user interface (UI) provided by a program on the display 304 and receives input from the user via the touch panel of the display 304. The acceleration sensor 306 outputs acceleration in three axial directions, which are coordinate axes x, y, and z illustrated in FIG. 3, by an electrostatic capacitance method or the like, for example. Regarding this acceleration, when the display 304 is facing directly up (at the sky), assuming that gravitational acceleration is g, (0, 0, g) is outputted. The directional sensor 307 is a sensor for measuring geomagnetism and outputs a three-dimensional vector indicating a north direction in the x, y, and z coordinate system illustrated in FIG. 3.

<Functional Configuration>

FIG. 5 is a configuration diagram illustrating a functional configuration of the information processing apparatus of the present embodiment. An OS 3 is an operating system and is a set of instructions for controlling input and output and for starting and switching applications. A device driver 408 is a set of instructions included in the OS 3 and controls the display 304, the camera 308, and various sensors incorporated in the information processing apparatus 1. The respective applications can control these devices by sending a predetermined instruction to the OS 3.

An appearance display application 2 is a set of instructions for reading information from the HDD 305 or a storage medium on the Internet and displaying it on the display 304. The appearance display application 2 includes an appearance information obtainment unit 401, an illumination information obtainment unit 402, a user gaze direction obtainment unit 403, an appearance observation gaze direction calculation unit 404, a target object image rendering unit 405, an appearance observation gaze direction rendering unit 406, and an output image compositing unit 407.

The appearance information obtainment unit 401 obtains a diffuse reflection intensity, a specular reflection intensity, glossiness, and a normal map as appearance information of a target object. The illumination information obtainment unit 402 obtains an environment map as illumination information. Details of the environment map will be described later. The user gaze direction obtainment unit 403 estimates the position of the user's eye with respect to the information processing apparatus 1 from an RGB image obtained by the camera 308 to obtain a gaze direction for when viewing the target object displayed on the display 304. The appearance observation gaze direction calculation unit 404 calculates from the environment map a gaze direction from which the appearance of the target object is easily visually recognized. The target object image rendering unit 405 renders from the appearance information, the environment map, and the user gaze direction an image I1 representing a view from the user gaze direction when the target object is illuminated by the environment map.

The appearance observation gaze direction rendering unit 406 render an image I2 representing a user gaze direction and a gaze direction for observing appearance. The output image compositing unit 407 composites the image I1 and the image I2 and generates an image to be displayed on the display 304.

<Processing>

FIG. 6 is a flowchart for explaining processing to be executed in the appearance display application 2. Hereinafter, a description will be given for details on the processing to be executed in the appearance display application 2 with reference to FIG. 6. Hereinafter, the respective steps are denoted by adding an S before the reference numeral.

In S501, based on an instruction from the user, the appearance information obtainment unit 401 obtains from a data storage region a diffuse reflection intensity $\rho d$ (x, y, i), a specular reflection intensity $\rho s$ (x, y, i), a glossiness $\sigma$ (x, y, i), and a normal N (x, y, k) as appearance information. Here, the data storage region is, for example, information that has been stored in advance on a website of a product viewed on an Internet shopping website accessed by the user. Here, x and y denote position coordinates on a target object. i indicates which of R, G, and B color signals it is. k indicates which of an x component, a y component, and a z component of a normal direction it is. The diffuse reflection intensity, specular reflection intensity, and glossiness in the present embodiment are arrays holding 8-bit information for each set of position coordinates and for each color signal. The normal direction is an array holding 8-bit information for each set of position coordinates and for each component, and a range from −1 to 1 of each component is associated with a value from 0 to 255. The type of appearance information in the present embodiment is an example, and for example, the specular reflection intensity may be held as 32-bit floating point information.

In S502, based on an instruction from the user, the illumination information obtainment unit 402 obtains from the data storage region an environment map E ($\theta a$, $\varphi a$, i) as illumination information. Thereafter, based on the posture of the information processing apparatus 1, the illumination information obtainment unit 402 rotates the environment map E ($\theta a$, $\varphi a$, i) so that the real world and the coordinate system are consistent.

Figure 7A:
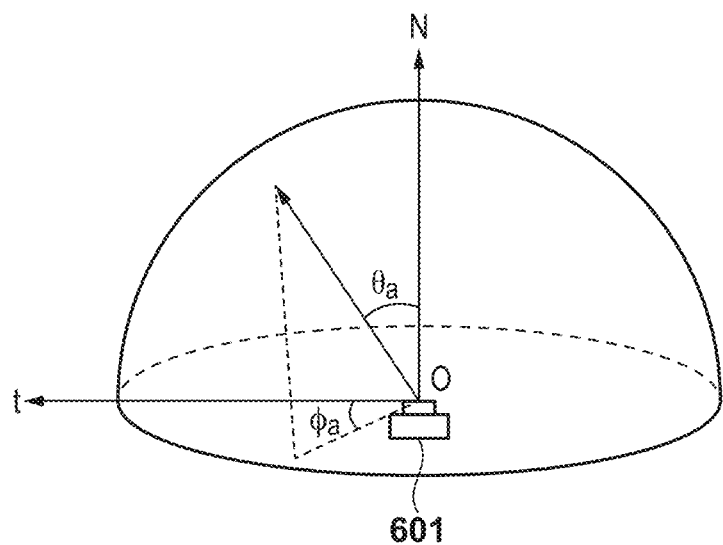
FIGS. 7A and 7B are diagrams for explaining an environment map.
Figure 7B:
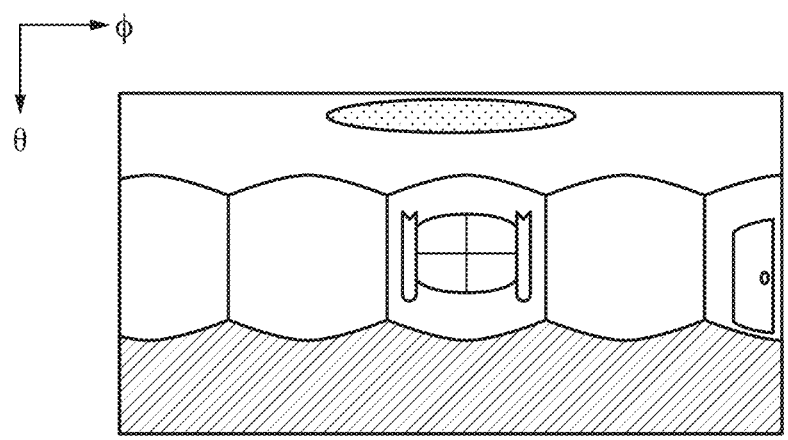

Here, a description will be given for details on an environment map with reference to FIG. 7A, which represents a method for creating the environment map E ($\theta a$, $\varphi a$, i), and FIG. 7B, which represents an example of the created environment map E. The environment map E can be obtained by an omnidirectional camera 601 installed at an arbitrary point O (e.g., a central position on a floor surface of a room or a position where it is planned to operate the information processing apparatus 1). Specifically, the intensity of light with respect to a gaze direction ($\theta a$, $\varphi a$) from the arbitrary point O is measured, and the environment map E is created by storing the intensity of light measured for each gaze direction ($\theta a$, $\varphi a$) and for each color signal i. The environment map E is an image representing the intensity of light and is an omnidirectional image or the like.

Here, the position O of the imaging surface of the omnidirectional camera 601 is set as the origin, and $\theta a$ and $\varphi a$ represents a polar angle and an azimuth angle, respectively, with respect to the normal direction N of the imaging surface. In the present embodiment, the environment map E ($\theta a$, $\varphi a$, i) in which directly upward (sky) is $\theta a=0$ and the north direction is $\varphi a=0$ is obtained, and the environment map E stores 8-bit intensity information for each angle and for each color signal. The number of pixels is assumed to be 1920×1080.

Further, rather than using the omnidirectional camera 601, a configuration may be taken so as to obtain the environment map E at the arbitrary point O by the user holding the information processing apparatus 1 at that position and capturing the surroundings while rotating 360° at that position.

The form of the illumination information in the present embodiment is an example, and for example, the signal intensity of the environment map may be held as 32-bit floating point information, and the origin of the polar angle and the azimuth angle need not be determined as described above.

Next, a three-dimensional vector d representing the north direction is obtained via the directional sensor 307 of the information processing apparatus 1, and a three-dimensional vector a representing the acceleration of the information processing apparatus 1 is obtained via the acceleration sensor 306. Based on the two vectors, the vectors d and a, three angles of rotation (r, p, y) in roll, pitch, and yaw directions, which represent conversion from a reference coordinate system in which the x-axis points to the east, the y-axis points to the north, and the z-axis points directly up (at the sky) to the coordinate system that has been fixed to the information processing apparatus 1 illustrated in FIG. 3, are calculated.

A description for the calculation method will be omitted as it is known. The environment map E ($\theta a$, $\varphi a$, i) is rotated based on the angles of rotation (r, p, y) so that the directly upward (sky) direction and the north direction of the environment map E ($\theta a$, $\varphi a$, i) coincide with the directly upward (sky) direction and the north direction in real space, and thereby real space and the coordinate system are made to be consistent. As a result, especially when utilizing an environment map in which illumination environment of surroundings in which observation is performed is reflected, it is possible to maintain optical consistency with real space.

Figure 8:
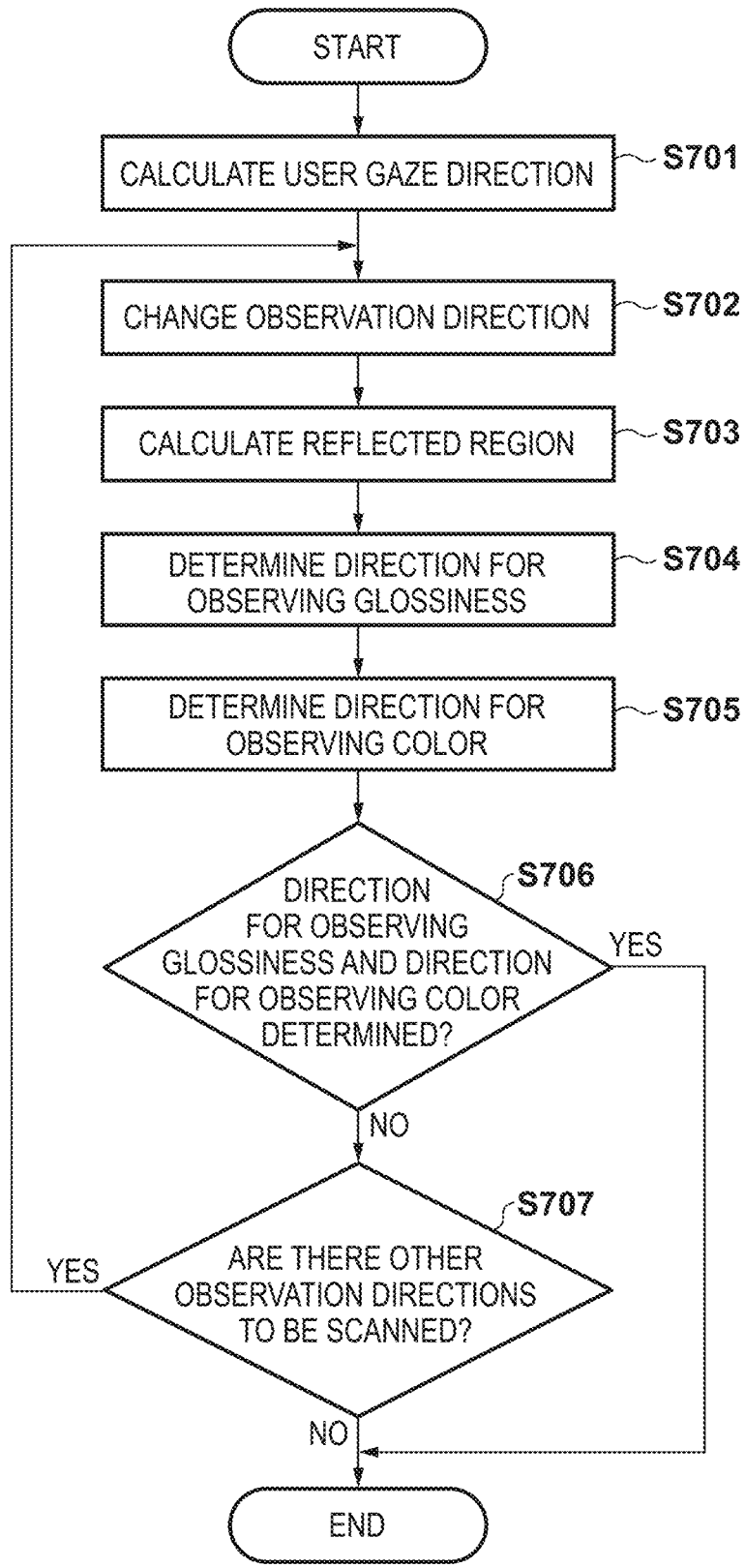
FIG. 8 is a flowchart of processing for calculating a gaze direction

In S503, the appearance observation gaze direction calculation unit 404 calculates from the illumination information gaze directions that are suitable for observing color and glossiness. Here, FIG. 8 is a flowchart representing the details of S503. Hereinafter, a description will be given with reference to FIG. 8.

In S701, the user gaze direction obtainment unit 403 first obtains an RGB image including the user's face via the camera 308. Then, based on the RGB image, the user gaze direction obtainment unit 403 estimates a gaze direction (R, Θ, Φ) from the position of the user's eyes and from which is viewed a target object displayed in the center of the display 304.

Here, the gaze direction (R, Θ, Φ) is represented by a three-dimensional polar coordinate system in which a polar angle in the normal direction of the display 304 is Θ, an azimuth angle is Φ, and the origin is the center point of the display 304. A vector (xr, yr, zr) that is directed from the camera 308 toward an eye position is obtained from a distance from the camera 308 to the user's eye estimated by a known depth estimation technique that uses an RGB monocular image and a two-dimensional position of the user's eye in the image. Using a vector (X, Y, 0) that is directed from the camera 308 toward the center point of the display 304, the gaze direction (R, Θ, Φ) for when viewing a target object displayed on the display 304 is obtained by the following equation.

[EQUATION 3]

$$R = \sqrt{(x_r - X)^2 + (y_r - Y)^2 + z_r^2} \quad (3)$$

$$\theta = \arccos\left(\frac{z_r}{\sqrt{(x_r - X)^2 + (y_r - Y)^2 + z_r^2}}\right)$$

$$\phi = \text{sgn}(y_r - Y)\arccos\left(\frac{x_r - X}{\sqrt{(x_r - X)^2 + (y_r - Y)^2}}\right)$$

From the subsequent S702 to S707, the processing is performed while scanning observation directions, and when there is no observation direction to be scanned, the repetition is terminated according to S707.

The observation direction to be scanned is determined as follows. First, a three-dimensional polar coordinate system in which a polar angle in an average normal direction of a target object is θ, an azimuth angle is φ, and a center position of the target object is the origin is considered. At this time, a hemispherical region of an environment map in a range of 0 to 90 degrees of θ and a range of 0 to 360 degrees of φ of the target object is a region from which the target object is illuminated. The observation directions are scanned in order in this hemispherical region, and it is determined in processing, which will be described later, whether they are suitable for observing a color and a glossiness of the target object. At this time, a distance from the origin of a viewpoint to be scanned is fixed and is set to be equal to a distance R of the eye from the target object obtained in S701. In the present embodiment, θ and φ in the hemispherical region are each divided into 20 segments to determine the observation direction (θl, φl) to be scanned.

Figure 9A:
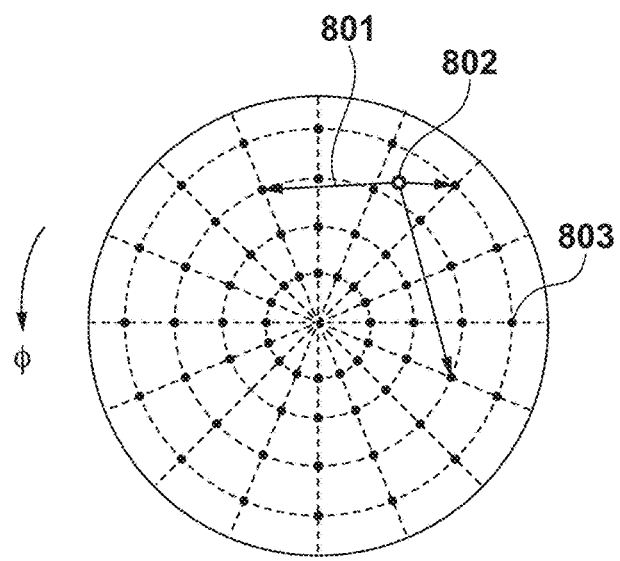
FIGS. 9A, 9B, and 9C are diagrams for explaining calculation of a reflected region.

Here, FIG. 9A is a diagram for explaining the order of scanning. The observation directions are ordered by distance 801 between an observation direction 803 to be scanned and an obtained user gaze direction 802, and scanning is performed sequentially starting from those with the shortest distance. Since this makes it possible to preferentially present the gaze direction that is closest from the user gaze direction, it is possible to shorten the distance when the user moves from the original gaze direction to the gaze direction for observing appearance, and thereby it is possible to expect an improvement in convenience. Although in the present embodiment the distance is used for ordering the observation directions to be scanned, the observation directions may be ordered in accordance with, for example, the magnitude of a relative angle from the user gaze direction.

In S702, the appearance observation gaze direction calculation unit 404 orders the observation directions in the above-described manner and selects the observation direction whose distance from the user gaze direction is the shortest. From the second and subsequent repetitions, the observation directions are selected in order of shortest distance to the user among the ordered observation directions. Thus, the direction whose angle that is formed with the user gaze direction is small is determined as an observation gaze direction that is suitable for observing the appearance of the target object.

In S703, the appearance observation gaze direction calculation unit 404 calculates a partial region (reflected region) of the environment map reflected on a target object 805.

Figure 9B:
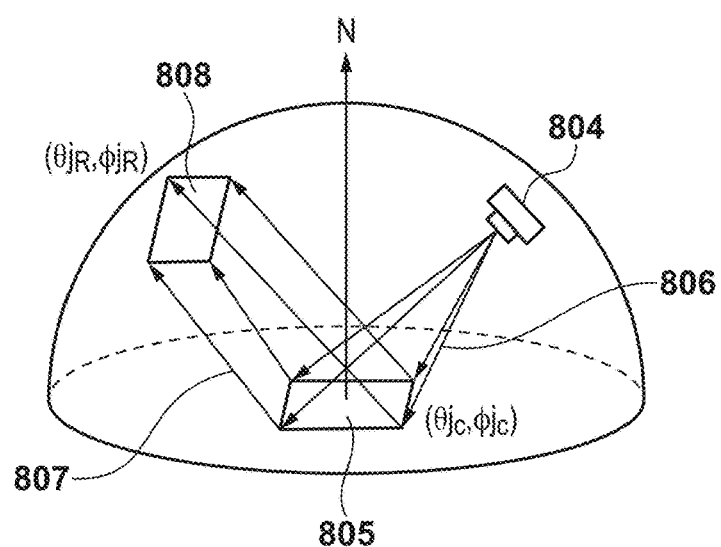
Figure 9C:
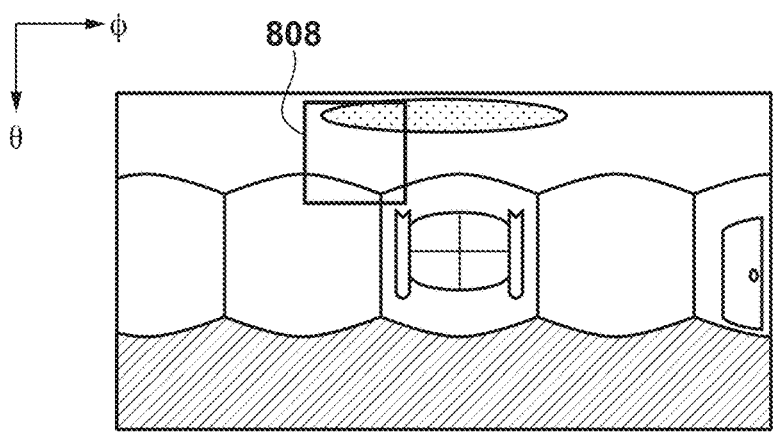

Here, FIG. 9B is a diagram illustrating calculation of a reflected region, and FIG. 9C is a diagram illustrating a partial region, which is the reflected region, of an environment map. First, directions 806 (θjc, φjc) toward the four corners of the rectangular target object 805 from a gaze direction position 804 to be scanned are calculated. Here, j is a subscript representing each corner of the target object 805. The target object 805 is assumed to be, for example, a rectangular region, which is −w/4≤x≤w/4, −d/4≤y≤d/4, and z=0 when it is assumed that the vertical length of the display 304 of the information processing apparatus 1 is d and the horizontal length is w. (θjc, φjc) is specifically obtained as in the following equation.

[EQUATION 4]

$$\theta_{jc} = \arccos\left(\frac{-R\cos\theta_l}{\sqrt{(x_j - R\sin\theta_l\cos\varphi_l)^2 + (y_j - R\sin\theta_l\sin\varphi_l)^2 + (-R\cos\theta_l)^2}}\right) \quad (4)$$

$$\varphi_{jc} = \text{sgn}(y_j - R\sin\theta_l\sin\varphi_l)\arccos\left(\frac{x_j - R\sin\theta_l\cos\varphi_l}{\sqrt{(x_j - R\sin\theta_l\cos\varphi_l)^2 + (y_j - R\sin\theta_l\sin\varphi_l)^2}}\right) \quad (5)$$

Here, (xj, yj) represents x components and y components, (−w/4, −d/4), (−w/4, d/4), (w/4, −d/4), and (w/4, d/4), of the coordinates of the four points representing the four corners of the target object 805. Directions 807 (θjr, φjr) in which the respective directions 806 are specularly reflected is calculated with reference to the average normal direction. Specifically, it is obtained by the following equation.

[EQUATION 5]

$$\theta_{jr} = 180° - \theta_{jc} \quad (5)$$

$$\varphi_{jr} = \varphi_{jc} - 180°$$

A partial region 808 of the environment map including the four directions 807 is designated as a reflected region. As a designation method, for example, a region of the environment map corresponding to a range from the minimum value to the maximum value of the polar angles θ of the four directions 807 and a range from the minimum value to the maximum value of the azimuth angle φ is set as the reflected region.

In S704, the appearance observation gaze direction calculation unit 404 determines from the illumination information a gaze direction that is suitable for observing a glossiness of the target object. As described above, the gaze direction that is suitable for observing glossiness is a gaze direction in which the light source is present in the specular reflection direction of the gaze and the specular reflection intensity and glossiness can be visually recognized. That is, the observation direction in which a portion in which there is illumination (a light source) in the illumination information is reflected in the target object is determined as an observation gaze direction that is suitable for observing a glossiness of the target object. In the present embodiment, the reflected region is gray-scaled to determine the gaze direction. The environment map, which is an array holding 8-bit intensity information for each set of coordinates and for each color signal, is converted into an array holding a luminance value in 8-bit information for each set of coordinates.

A description will be omitted for the conversion method as it is a known technique. A format for when grayscaling is performed is an example, and for example, the luminance value may be held as 32-bit floating point information.

When there are a threshold S1 or more pixels whose luminance is greater than or equal to a threshold E1 in the reflected region, the observation direction at that point in time is determined as the gaze direction for observing glossiness. The threshold E1 here is assumed to be, for example, a value obtained by subtracting a standard deviation of the luminance value from the maximum luminance value of the entire region of the environment map, and the threshold S1 may be, for example, 10% of the total pixels of the reflected region. When scanning observation directions, S704 is repeatedly executed; however, once a gaze direction for observing glossiness has been determined, by setting a flag, determination of a gaze direction for observing glossiness is skipped in the subsequent scanning.

In S705, the appearance observation gaze direction calculation unit 404 determines a gaze direction that is suitable for observing a color of the target object. As described above, the gaze direction that is suitable for observing color is a gaze direction in which the light source is not present in the specular reflection direction of the gaze and the diffuse reflection component is more dominant than the specular reflection component. In the present embodiment, the reflected region is gray-scaled, and when the maximum luminance of the reflected region is less than or equal to the threshold E2, the observation direction at that point in time is determined as the gaze direction for observing color. The threshold E2 here can be, for example, the first quartile of the luminance of the entire region of the environment map. That is, the observation direction in which a portion in which there is no illumination (a light source) in the illumination information is reflected in the target object is determined as an observation gaze direction that is suitable for observing a color of the target object. When scanning observation directions, S705 is repeatedly executed; however, once a gaze direction for observing color has been determined, by setting a flag, determination of a gaze direction for observing color is skipped in the subsequent scanning.

In S706, when both the gaze direction for observing glossiness and the gaze direction for observing color have been determined, the scanning is terminated. If both have not been determined, the processing proceeds to S707.

In S707, the appearance observation gaze direction calculation unit 404 determines whether or not there is another observation direction to be scanned. If there is another observation direction to be scanned, the processing returns to S702. Meanwhile, if there is no other observation direction to be scanned, the processing ends.

This concludes the description of the flowchart of FIG. 8, and the description of the flowchart of FIG. 6 is returned to.

The processing of the subsequent S504 to S509 is repeated until the user's termination instruction is received.

In S505, the user gaze direction obtainment unit 403 obtains a user gaze direction (R, Θ, Φ). A description for this processing will be omitted as the processing is the same as that of S701.

In S506, the target object image rendering unit 405 renders the image I1, which represents the view from the user gaze direction (R, Θ, Φ) when the target object 805 is illuminated by the environment map E (θa, φa, i), using a known image-based lighting technology. The size of the image I1 is the same as, for example, the size of the target object 805 used for calculation in S704 and is 50% of the size of the display 304 of the information processing apparatus 1. In addition, the rendering is performed so that the normal of the display 304 and the average normal of the target object 805 coincide. At this time, the coordinate system of the user gaze direction (R, Θ, Φ) and the coordinate system used for calculation in S704 are made to coincide.

In S507, the appearance observation gaze direction rendering unit 406 renders the image I2, which presents the gaze direction for observing appearance and the user gaze direction. Details of the processing will be described later.

In S508, the output image compositing unit 407 generates an image to be displayed on the display 304 by compositing two images, the image I1 and the image I2.

Figure 10:
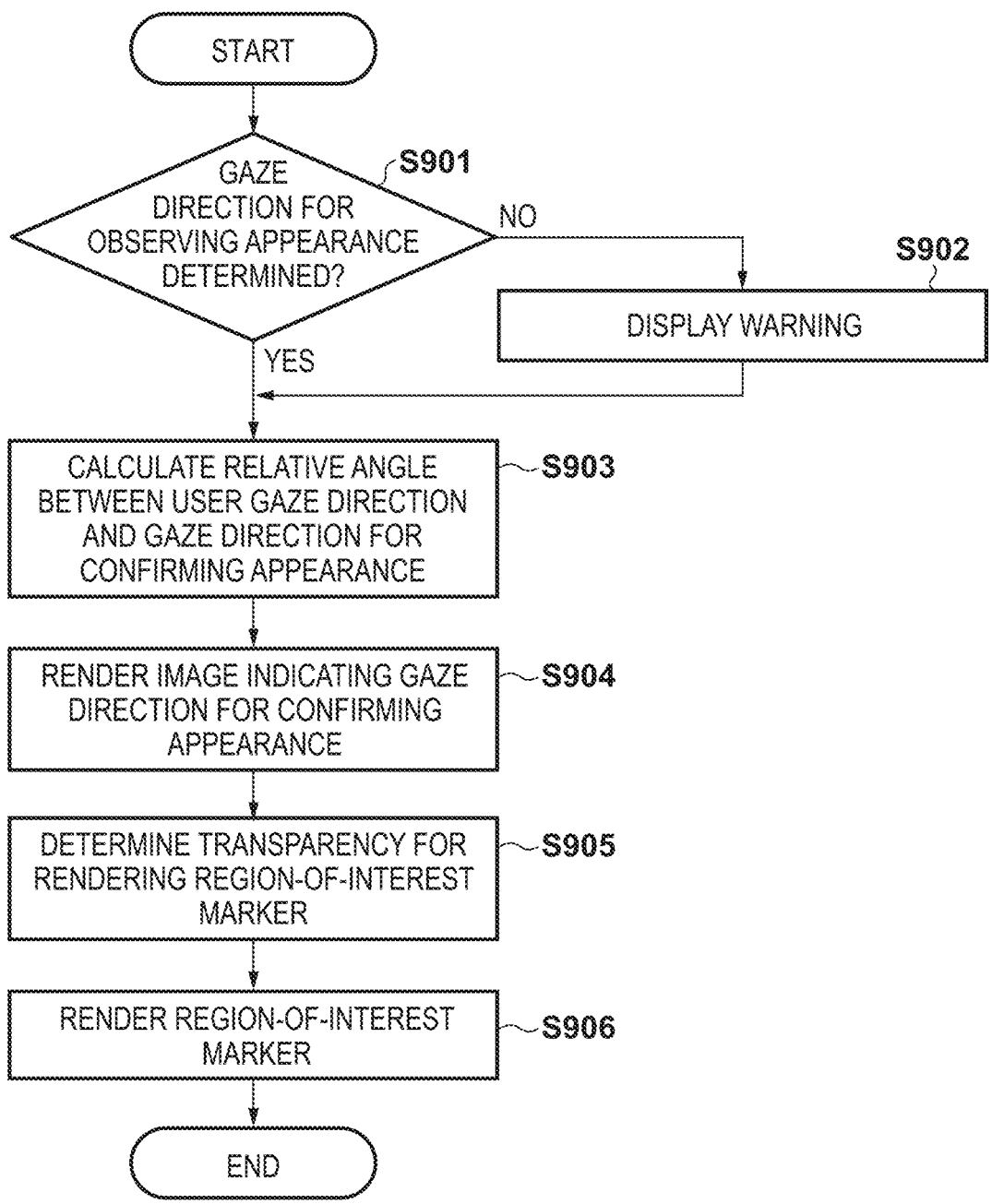
FIG. 10 is a flowchart of processing for rendering an image.
Figure 11A:
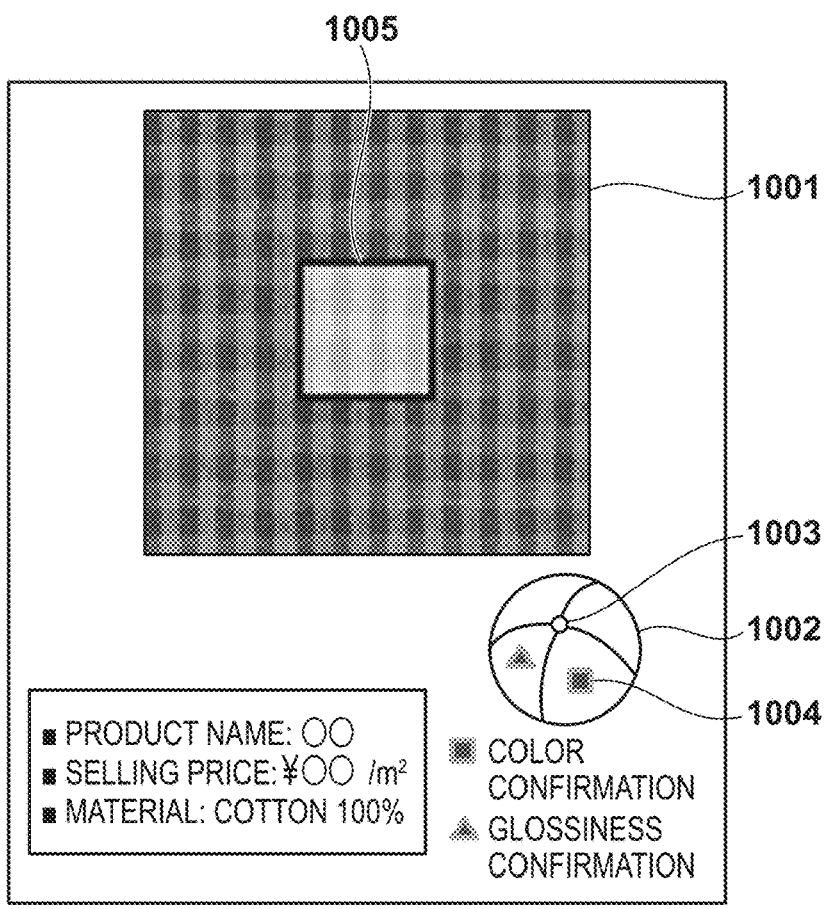
FIGS. 11A and 11B illustrate examples of a user interface.

Here, FIG. 10 is a detailed flowchart of S507, and FIG. 11A is an example of an image to be outputted by the output image compositing unit 407. A target object image 1001 illustrated in FIG. 11A is the image I1 rendered in the target object image rendering unit 405. The image I2 is configured by a three-dimensional hemisphere model 1002, a user gaze direction marker 1003, appearance observation gaze direction markers 1004, and a region-of-interest marker 1005. Hereinafter, a description will be given for details on the processing of S507 with reference to FIG. 10.

First, in S901, the appearance observation gaze direction rendering unit 406 determines whether or not the gaze direction for observing appearance has been determined in the above-described processing S705 and S704. If it has been determined, the processing proceeds to S903. Meanwhile, if it has not been determined, the processing proceeds to S902.

Figure 11B:
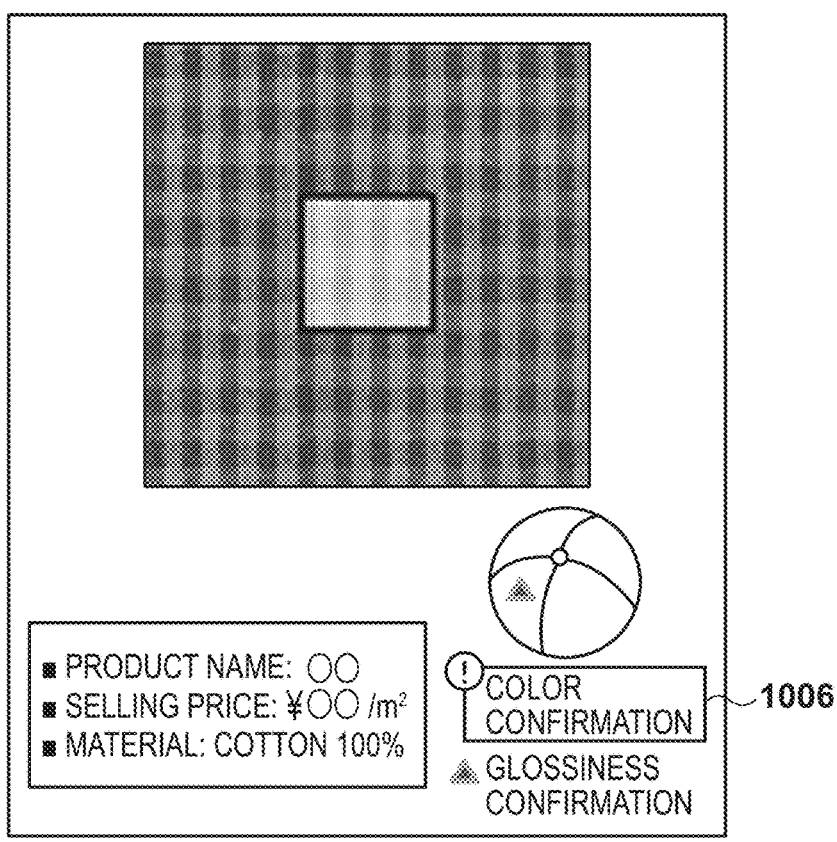

In S902, the appearance observation gaze direction rendering unit 406 notifies the user that there is no gaze direction for observing appearance, thereby achieving an effect of prompting the user, who wishes to observe appearance, to change the posture of the tablet or the environment map. Here, FIG. 11B is a diagram illustrating an example of a warning indication. The user is notified by a warning indication 1006. In the illustrated example, it is indicated that a gaze direction that is suitable for observing a color of a target object has not been determined.

In S903, the appearance observation gaze direction rendering unit 406 calculates relative angles ($\Delta\theta c$, $\Delta\varphi c$) and ($\Delta\theta l$, $\Delta\varphi l$) between the obtained user gaze direction (Θ, Φ) and the two types of appearance confirmation gaze directions ($\theta c$, $\varphi c$) and ($\theta l$, $\varphi l$). A relative angle is calculated by, for example, the following equation.

[EQUATION 6]

$$\Delta\theta_c = \Theta - \theta_c$$
$$\Delta\varphi_c = \phi - \varphi_c$$
$$\Delta\theta_l = \Theta - \theta_l$$
$$\Delta\varphi_l = \phi - \varphi_l \qquad (6)$$

In S904, the appearance observation gaze direction rendering unit 406 renders an image indicating angles relative to the user gaze direction calculated in S903. This image corresponds to the three-dimensional hemisphere model 1002, the user gaze direction marker 1003, and the appearance observation gaze direction markers 1004 of FIG. 11A. When a polar angle and an azimuth angle of the three-dimensional hemisphere model 1002 with respect to a direction from the center of the bottom surface toward a zenith portion are assumed as T and P, the user gaze direction marker 1003 is displayed on the spherical surface at T=0 and P=0. Then, the appearance observation gaze direction markers 1004 are displayed at two points, (T, P)=($\Delta\theta c$, $\Delta\varphi c$) and ($\Delta\theta l$, $\Delta\varphi l$), on the spherical surface. In order for the approximate shape to be seen, the spherical surface of the three-dimensional hemisphere model is displayed, for example, as a grid obtained by dividing the polar angle T and the azimuth angle P into fixed intervals.

In S905, the appearance observation gaze direction rendering unit 406 determines from a magnitude of the relative angles calculated in S903 the rendering transparency of the region-of-interest marker 1005 to be rendered in S906. A magnitude A of relative angles is defined by, for example, the following equation.

[EQUATION 7]

$$A = \sqrt{(\Delta\theta)^2 + (\Delta\varphi)^2} \qquad (7)$$

Here, $\Delta\theta$ and $\Delta\varphi$ represent the relative polar angles and azimuth angles between the two types of gaze directions for confirming appearance and the user gaze direction, respectively. When the magnitude A of the relative angles is large, the rendering transparency of the region-of-interest marker 1005 is assumed to be 0%, and as the magnitude A of the relative angles decreases, the rendering transparency of the region-of-interest marker 1005 approaches 100%. For example, the transparency is 0% when A is 90 degrees or more, the transparency is 100% when A=10 degrees or less, and therebetween the transparency is linearly changed with respect to the value of A.

As a result, when observing the appearance of the region-of-interest, the user is not prevented from observation by the region-of-interest marker 1005, and when searching for the gaze direction for observing appearance, the user can ascertain the region of interest with the region-of-interest marker 1005.

In S906, the appearance observation gaze direction rendering unit 406 renders the region-of-interest marker 1005 based on the transparency determined in S905. The region-of-interest marker 1005 is assumed to be, for example, centered on the center position of the target object image I1, and the size is 10% of the size of the display 304.

Thus, a three-dimensional hemisphere model, in which the zenith portion (e.g., 1003) of the spherical surface of the three-dimensional hemisphere model is indicated as the user gaze direction and an observation gaze direction that is suitable for observing an appearance of a target object is indicated by a point (e.g., 1004) on the spherical surface as a relative direction with respect to the user gaze direction, is rendered. It becomes possible for the user to intuitively ascertain by looking at this display how to change their gaze direction for it to become a gaze direction that is suitable for observing appearance.

This concludes the description for the processing flow of FIG. 6.

Effect of Embodiment

As described above, in the present embodiment, appearance information, which indicates an appearance of a target object, and illumination information (information of an environment map), which is for illuminating the target object, are obtained. Then, based on those pieces of information, an observation gaze direction that is suitable for observing the appearance of the target object (gaze direction in which it is easy to visually recognize a color and a glossiness of the target object) is calculated, and information, which indicates that observation gaze direction, is rendered and presented to the user.

As a result, it becomes easy for the user to ascertain from which direction to observe, and therefore, it becomes possible to effectively confirm an appearance, such as color and glossiness, of a target object.

<Variation>

The processing of S503 of FIG. 6 is executed after obtaining an environment map and appearance information in accordance with the instruction of the user; however, the order of processing may be changed as follows. A gaze direction for observing appearance is calculated in advance from the environment map and appearance information by the same processing as S503 and stored in a data storage destination. Then, when the environment map and the subject information are obtained by the instruction of the user, at the same time, a corresponding gaze direction for observing appearance is obtained from the data storage destination and presented.

The environment map is obtained as the illumination information in S502; however, it can be obtained by obtaining a three-dimensional position, a direction, and intensity information of a light source as the illumination information and then converting them into an environment map by performing bake processing, which is a common CG rendering technique.

A user gaze direction is obtained in S505 and S701 by an RGB camera incorporated in the information processing apparatus; however, the gaze direction may be estimated in coordination with a ranging sensor, or parallax information obtained from a plurality of cameras may be used. Further, for example, a camera for light other than visible light, such as an infrared camera, may be used. Furthermore, a camera need not be incorporated so long as a position relative to the display can be obtained. A gaze tracking apparatus may also be used to obtain the user gaze direction.

Further, the method for calculating the reflected region described in the description of S704 is only one example, and for example, and configuration may take into account an effect of a change in the reflected region due to the variation in the normals of the target object by expansion of a partial region of the environment map in accordance with a variation in the normals of the target object. Further, by actually performing ray tracing in the opposite direction with respect to each point of the target object, the reflected region, which takes into account the normal direction for each position of the target object, may be obtained.

Second Embodiment

In the first embodiment, a description has been given for an example of calculating and presenting a gaze direction that is suitable for observing a color and a glossiness of a subject. In the present embodiment, a description will be given for an example of calculating and present a gaze direction that is suitable for observing the unevenness of a subject.

Figure 12:
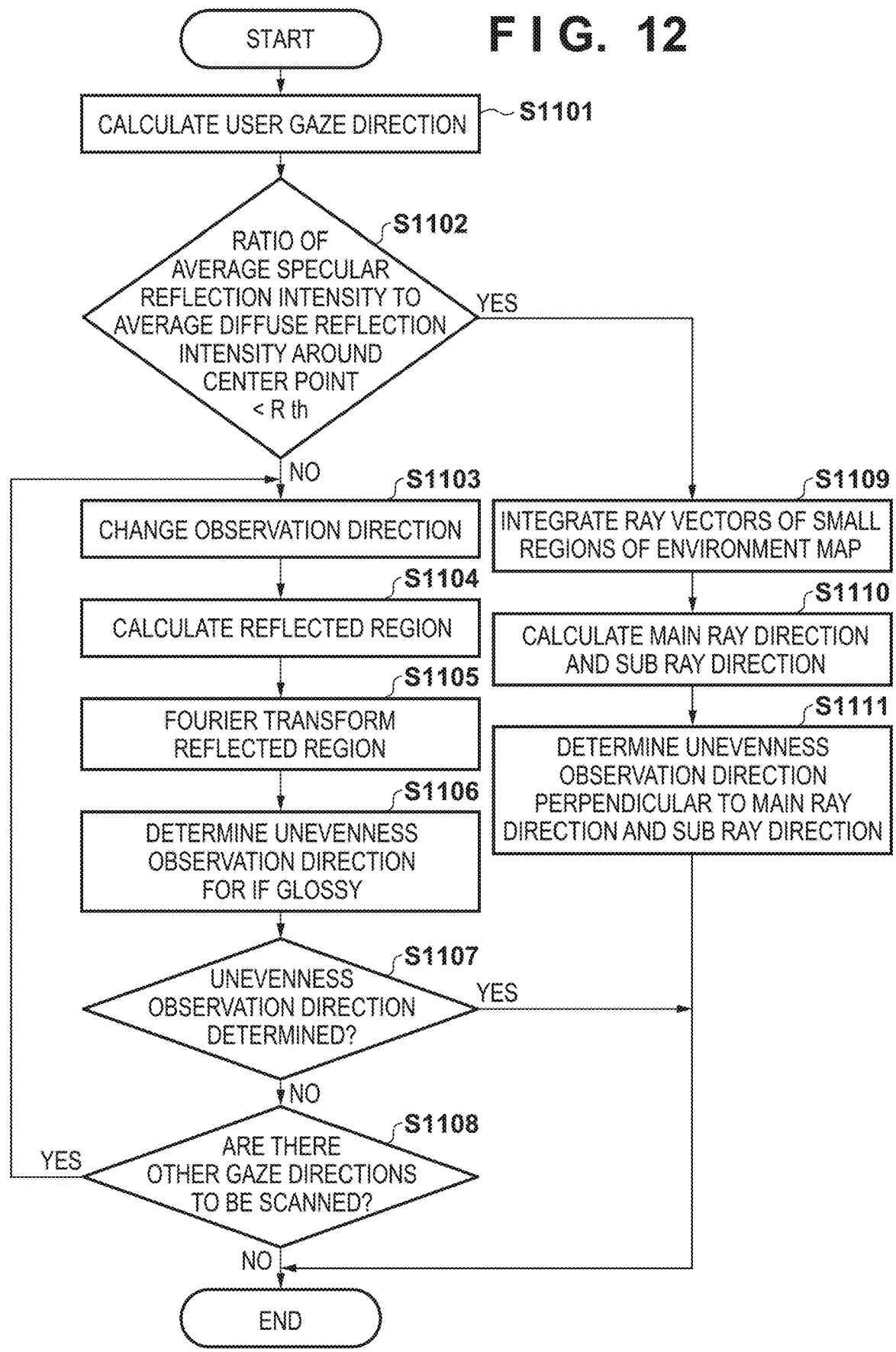
FIG. 12 is a flowchart of processing for calculating a gaze direction.

Descriptions will be omitted for the appearance, hardware configuration, functional configuration and processing flow other than that of S503 of the information processing apparatus in a second embodiment as they are the same as in the first embodiment. Details on the processing of S503 in the present embodiment are indicated in FIG. 12. Hereinafter, the details on the processing will be described with reference to the flowchart of FIG. 12.

<Processing>

In S1101, the user gaze direction obtainment unit 403 obtains the gaze direction of the user.

A description for this processing will be omitted as the processing is the same as that of S701.

In S1102, the appearance observation gaze direction calculation unit 404 determines the intensity of glossiness of the target object. In the present embodiment, an array holding, for example, 8-bit luminance value information for each set of coordinates is obtained by performing grayscale conversion on the diffuse reflection intensity ρs and the specular reflection intensity ρd. It is determined whether a ratio of the average specular reflection luminance to the average diffuse reflection luminance in the entire region of the target object is less than or equal to a threshold R1. Here, the threshold R1 is, for example, 1.

Processing of S1103 to S1108 are steps of calculating a gaze direction that is suitable for observing unevenness when the glossiness of the target object is strong. As described above, the gaze direction that is suitable for observing unevenness is, in this case, a specular reflection direction of a small light source or a light source whose edge is sharp. When these light sources are present in the reflected region, the reflected region contains many high spatial frequency components. Therefore, it is possible to determine the presence or absence of these light sources by calculating the spatial frequency information of the reflected region.

Descriptions will be omitted for S1103, S1104, S1108 as processing is the same as that of S702, S703, and S707, respectively.

In S1105, the appearance observation gaze direction calculation unit 404 performs two-dimensional FFT processing on the reflected region and converts it into spatial frequency information.

In S1106, the appearance observation gaze direction calculation unit 404 determines whether or not the observation direction is suitable for observing unevenness. When the spatial frequency components of the reflected region includes a threshold D1 or more components that are, at absolute values, greater than or equal to a threshold F1, the observation direction (θb, φb) at that point in time is determined as the gaze direction for observing unevenness. The threshold F1 is, for example, 10 times a reciprocal of the width of the target object 805, which is 2/w, and the threshold D1 is, for example, 10% of the total frequency components included in the reflected region 808.

Thus, when the specular reflection intensity is greater than or equal to the diffuse reflection intensity, the observation direction in which the portion, in which there is the spatial frequency components that are greater than or equal to the threshold, in the illumination information is reflected in the target object is determined as the observation gaze direction that is suitable for observing the unevenness of the target object.

In S1107, if the gaze direction for observing unevenness is determined in S1106, the appearance observation gaze direction calculation unit 404 terminates the scanning of the observation directions. Meanwhile, if the gaze direction for observing unevenness is not determined, the processing proceeds to S1108.

Meanwhile, processing of S1109 to S1111 are steps of calculating a gaze direction that is suitable for observing unevenness when the glossiness of the target object is weak. As described above, when the glossiness is weak, the gaze direction that is suitable for observing unevenness is a direction that is perpendicular to the light source. However, there may be cases where the environment map includes a plurality of light sources. Therefore, in the present embodiment, an observation direction that is orthogonal to two directions, the direction of the strongest light source and the direction of integration of other light sources included in the environment map, is set as the gaze direction that is suitable for observing unevenness when the glossiness of the target object is weak.

Figure 13:
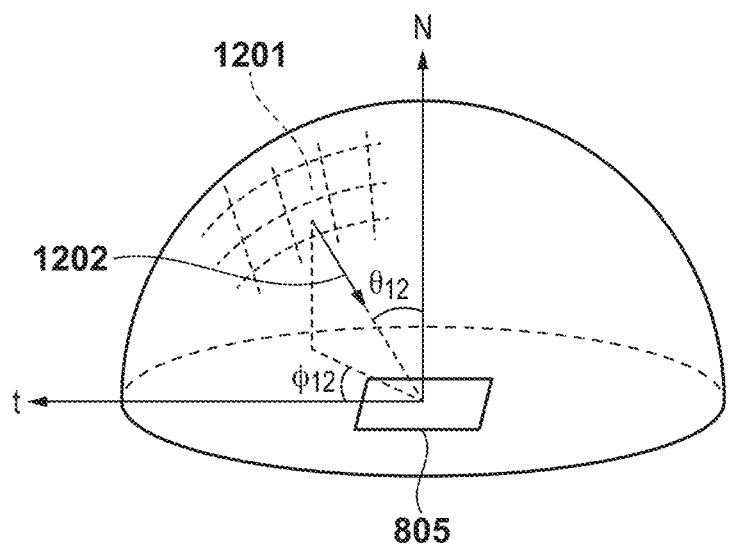
FIG. 13 is a diagram for explaining a method for calculating a gaze direction.

Here, FIG. 13 is a diagram illustrating a method for calculating a gaze direction that is suitable for observing unevenness when the glossiness of the target object is weak.

In S1109, the appearance observation gaze direction calculation unit 404 converts a partial region of the environment map, which corresponds to $0° \leq \theta \leq 90°$ when the polar angle in the average normal direction of the target object is θ and the azimuth angle is φ, into a grayscale image. Then, θ and φ are each divided into small regions 1201 by dividing each into, for example, 10 segments. When the small region 1201 is represented as, $\theta1 \leq \theta \leq \theta2$, $\varphi1 \leq \varphi \leq \varphi2$ using parameters θ1, θ2, φ1, and φ2, a vector 1202 whose magnitude is an integrated value of luminance of the small region and direction is (θ12, φ12) as expressed in the following equation is calculated for each small region.

[EQUATION 8]

$$\theta_{12} = 180° - \frac{(\theta_1 + \theta_2)}{2} \qquad (8)$$

$$\varphi_{12} = \frac{(\varphi_1 + \varphi_2)}{2} - 180°$$

In S1110, the appearance observation gaze direction calculation unit 404 defines the vector whose magnitude is the largest among the vectors obtained for the respective small regions as a main light source direction L1. The sum of the vectors for the respective small regions excluding the main light source direction L1 is defined as a sub light source direction L2.

In S1111, the appearance observation gaze direction calculation unit 404 sets a gaze direction (θb, φb) that is closer to the user gaze direction (Θ, Φ) among gaze directions that are orthogonal (perpendicular) to both the main light source direction L1 and the sub light source direction L2 as the gaze direction for observing unevenness.

Thus, when the specular reflection intensity is smaller than the diffuse reflection intensity, an observation direction perpendicular to the light source included in the illumination information is determined as an observation gaze direction that is suitable for observing the unevenness of the target object.

This concludes the description for the processing flow of FIG. 12.

Effect of Embodiment

As described above, the information processing apparatus according to the present embodiment calculates a gaze direction at which it is easily to visually recognize the unevenness of a target object from the environment map information and presents it to the user. As a result, the user can effectively confirm the unevenness of the target object.
<Variation>

In the present embodiment, in S1103, it is determined whether or not a target object is glossy based on the ratio of the specular reflection intensity and the diffuse reflection intensity; however, determination may be performed using, for example, a value of another function of the specular reflection intensity and the diffuse reflection intensity based on visual properties.

Further, in S1105, the frequency conversion technique is not limited to the two-dimensional FFT and may be, for example, a wavelet transform.

Third Embodiment

Figure 14:
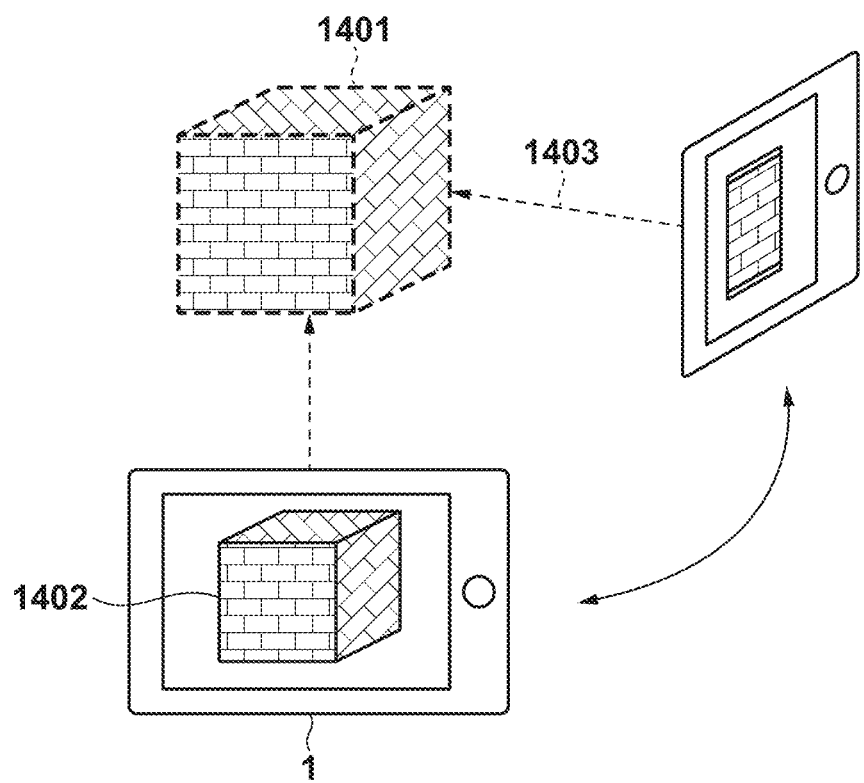
FIG. 14 is a diagram for explaining a use case of a third embodiment

In the present embodiment, similarly to the first and second embodiments, a tablet-type information terminal is used as the information processing apparatus. FIG. 14 represents a use case of the present embodiment. A target object 1401, which is a three-dimensional shape model imparted with appearance information, is displayed in real space coordinates so as to be fixed, and an image I402, which reproduces a view for when the target object 1401 is illuminated by the environment map, is displayed. Further, an application for observing an appearance of the target object 1401 by calculating from the position and posture of the information processing apparatus 1 a direction that is perpendicular to the surface of the display 304 of the information processing apparatus 1 as the user's gaze direction 1403 and dynamically changing the view corresponding to a dynamic change in the gaze direction is assumed. In the present embodiment, the gaze direction that is suitable for observing unevenness is presented in the application.

A description for the hardware configuration of the information processing apparatus according to the present embodiment will be omitted as it is the same as in the first embodiment.
<Functional Configuration>

Figure 15:
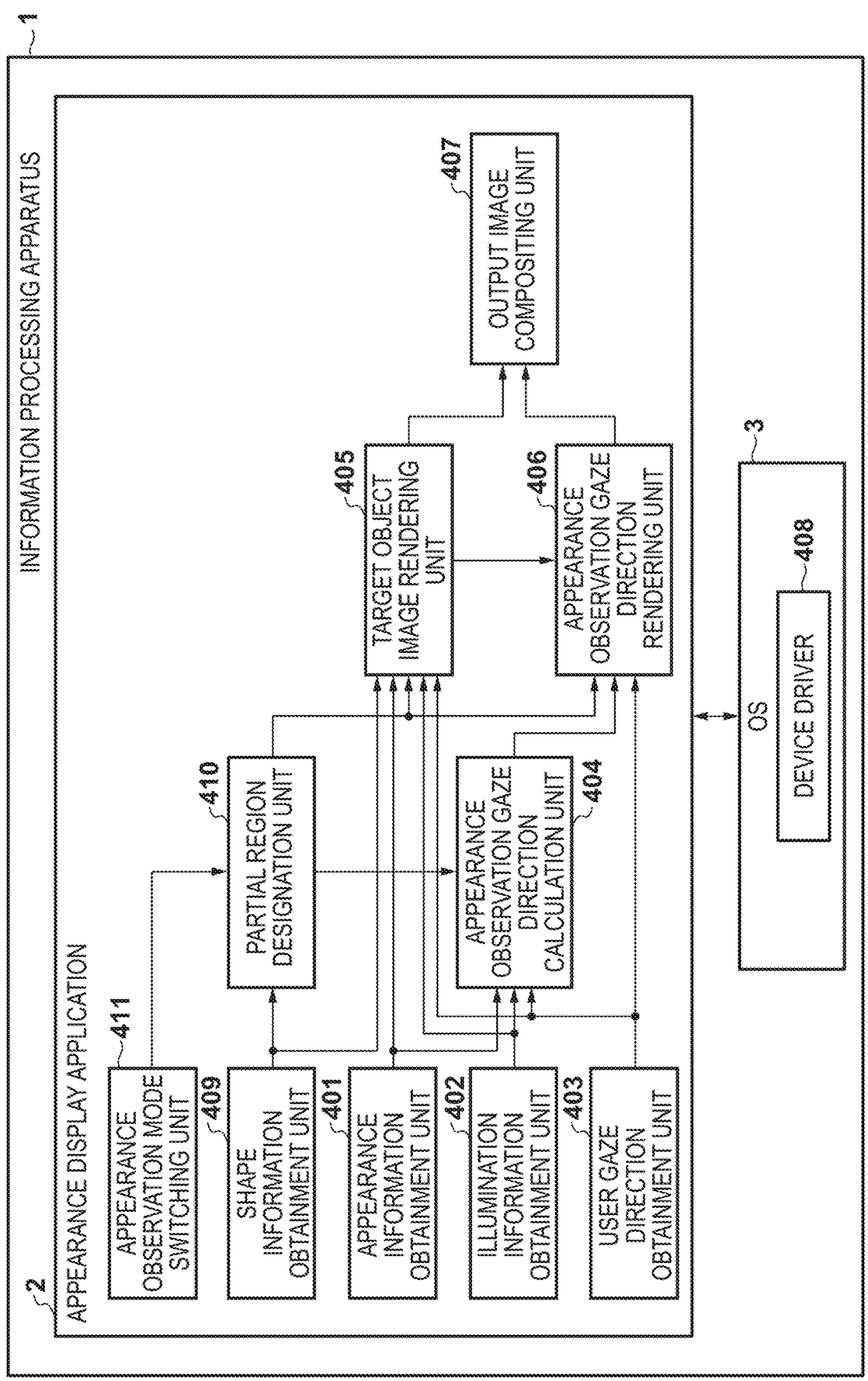
FIG. 15 is a diagram illustrating an example of a system configuration of the information processing apparatus.

FIG. 15 is a diagram illustrating a functional configuration of the information processing apparatus according to the present embodiment. The appearance display application 2 of the information processing apparatus 1 according to the present embodiment further includes a shape information obtainment unit 409, a partial region designation unit 410, and an appearance observation mode switching unit 411 in addition to the components described in the first embodiment.

The shape information obtainment unit 409 obtains shape information representing the three-dimensional shape of the target object. Based on an instruction from the user, the appearance observation mode switching unit 411 can transition from a first display mode for displaying only a view of the target object to a second display mode for presenting, in addition to the view of the target object, a gaze direction that is suitable for observing appearance. The partial region designation unit 410 specifies a partial region on the target object shape to be used by the appearance observation gaze direction calculation unit 404. Descriptions for other components will be omitted as they are the same as the components, which are denoted with the same numbers, of the first embodiment.
<Processing>

Figure 16:
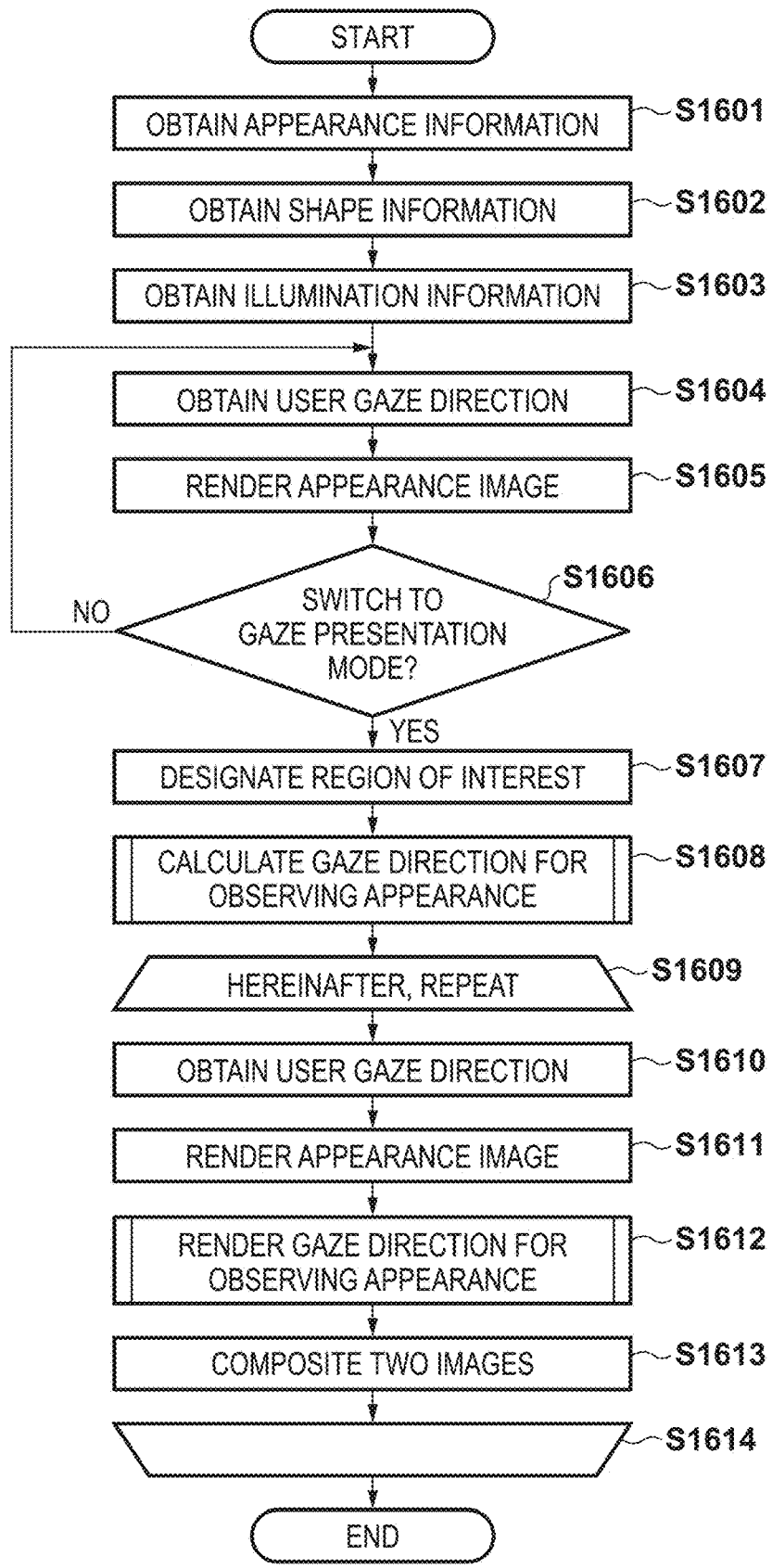
FIG. 16 is a flowchart of processing to be performed in the information processing apparatus.

FIG. 16 is a flowchart illustrating processing to be executed in the appearance display application 2 of the information processing apparatus 1 according to the present embodiment. Hereinafter, a description will be given for details on the processing with reference to FIG. 16.

In S1601, the appearance information obtainment unit 401 obtains appearance information of the target object. A description for this processing will be omitted as the processing is the same as that of S501.

In S1602, the shape information obtainment unit 409 obtains shape information representing the three-dimensional shape of the target object. The shape information is, for example, three-dimensional shape data described in a Wavefront OBJ format.

In S1603, the illumination information obtainment unit 402 obtains based on an instruction from the user an environment map E (θa, φa, i) as illumination information. The data format is the same as the format described in S502; however, in the present embodiment, in order to dynamically change the posture of the information processing apparatus 1, the environment map also needs to be dynamically rotated. Therefore, rotation is not performed during this processing.

The processing of S1604 and S1605 is processing for realizing the above-described first display mode for displaying only a view of the target object. In S1604, the user gaze direction obtainment unit 403 obtains the posture of the information processing apparatus 1 via the acceleration sensor 306 and the directional sensor 307. The negative direction on the z-axis of the coordinate system fixed to the information processing apparatus 1 in FIG. 3 is set as the gaze direction. The gaze direction of the information processing apparatus 1 and the position of the information processing apparatus 1 obtained when processing S1604 for the first time are defined as the initial gaze direction and the initial gaze position, respectively. Although the initial gaze position cannot be obtained directly, a relative position from the initial gaze position can be obtained by integrating an acceleration vector a outputted by the acceleration sensor 306.

In S1605, the target object image rendering unit 405 renders the image I1, which represents a view from the user gaze direction and gaze position of the target object fixed in the real space illuminated by the environment map fixed in real space. The virtual three-dimensional coordinate system and the environment map in which the target object exists are rotated according to the posture of the information processing apparatus 1, and the virtual three-dimensional coordinate system in which the target object exists is translated according to the relative position from the initial gaze position, so that the environment map and the target object are displayed as being fixed in the real space. The environment map is displayed so that the directly upward (sky) direction and north direction of the environment map coincide with the directly upward (sky) direction and north direction in real space. A detailed description for the details of this processing will be omitted as they are not the main focus of the present invention.

In S1606, the appearance observation mode switching unit 411 determines based on an instruction from the user whether to switch to the second display mode for presenting a gaze direction that is suitable for observing appearance.

If there has been an instruction from the user, the switch is performed. If there has been no instruction from the user, S1604 is returned to.

Figure 17:
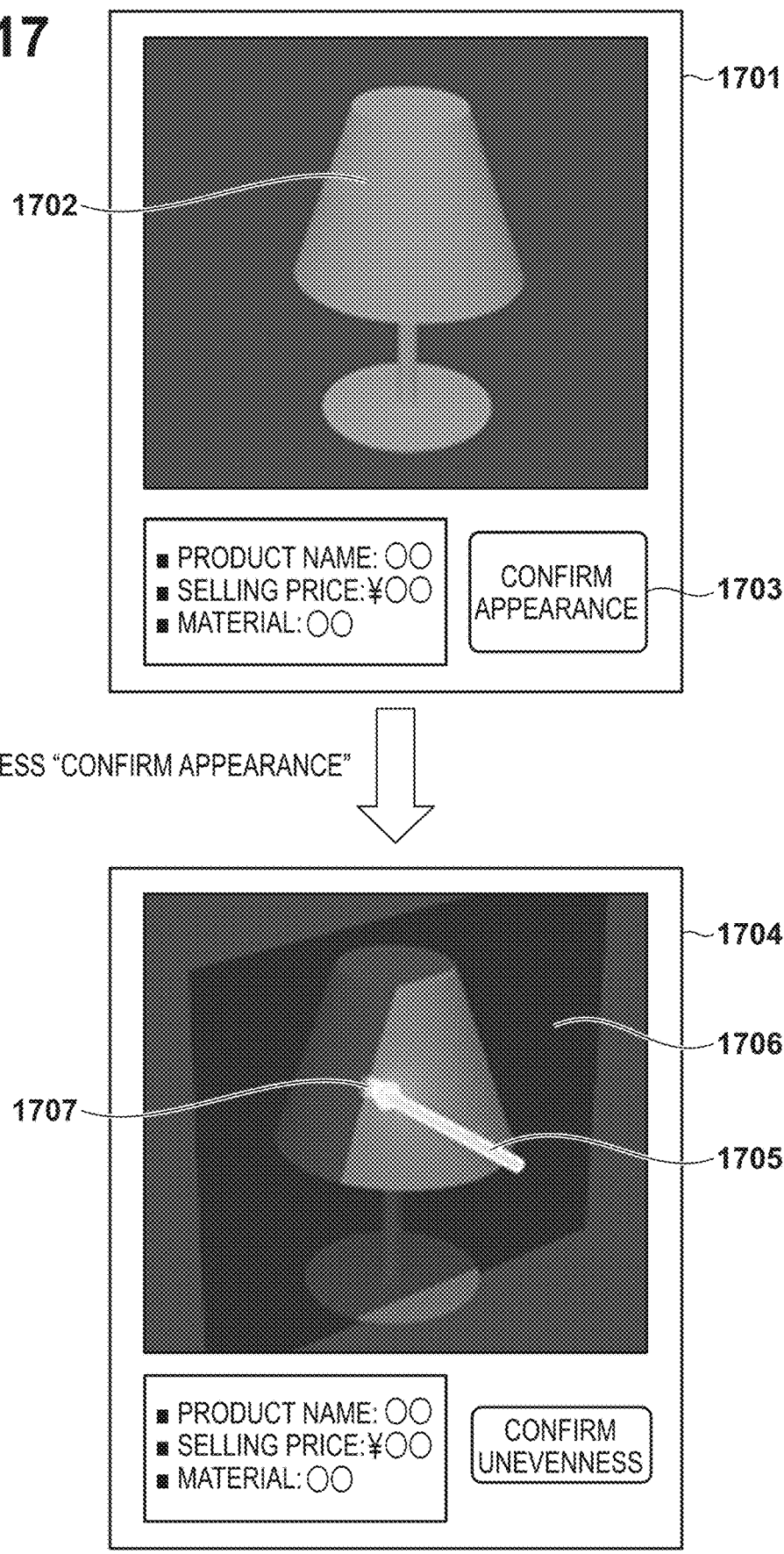
FIG. 17 illustrates examples of a user interface.

Here, FIG. 17 illustrates an example of an image to be displayed on a display region of the display 304 of the information processing apparatus 1. In the first display mode, an image 1702 representing a view of a target object, which is illuminated by an environment map, from the current user gaze direction is displayed in a display region 1701 of the display 304. When the user presses an appearance confirmation button 1703, the second display mode is transitioned to.

In S1607, the partial region designation unit 410 designates a region (region of interest) on the target object surface where the user confirms appearance. In order to determine the gaze direction for confirming appearance in S1608, which is the next step, the region of interest needs to be designated. In the present embodiment, when a button is pressed, the periphery of a point (xc, yc, zc) on the target object surface displayed in the center of the screen is set as the region of interest. A square region whose normal direction is the same as the normal direction at the point of the target object surface is set around the point on the target object surface. A length 1 of the sides of this square is set be 1/100 of the longest dimension among the height, width, and depth of the entire target object. However, the method for setting the region of interest is an example, and the center of the region of interest may be determined by, for example, the user selecting a partial region on an image of the target object displayed on the display 304. Further, the region of interest may be set using, for example, a rectangle or a circle, and the size of the region of interest may be determined, for example, in accordance with the curvature at a point on the target object surface or the sum of distances between each point on the target object surface and the region of interest.

In S1608, the appearance observation gaze direction calculation unit 404 determines a gaze direction that is suitable for observing unevenness. This processing is the same as the processing of S503 in the second embodiment; however, calculation is performed by replacing the size of the target object in the second embodiment with the length 1 of the side of the region of interest.

Then, the processing of from S1609 to S1614 is repeated until the user's termination instruction is received.

A description will be omitted for the processing of S1610 and S1611 as it is the same processing as S1604 and S1605, respectively.

Figure 18:
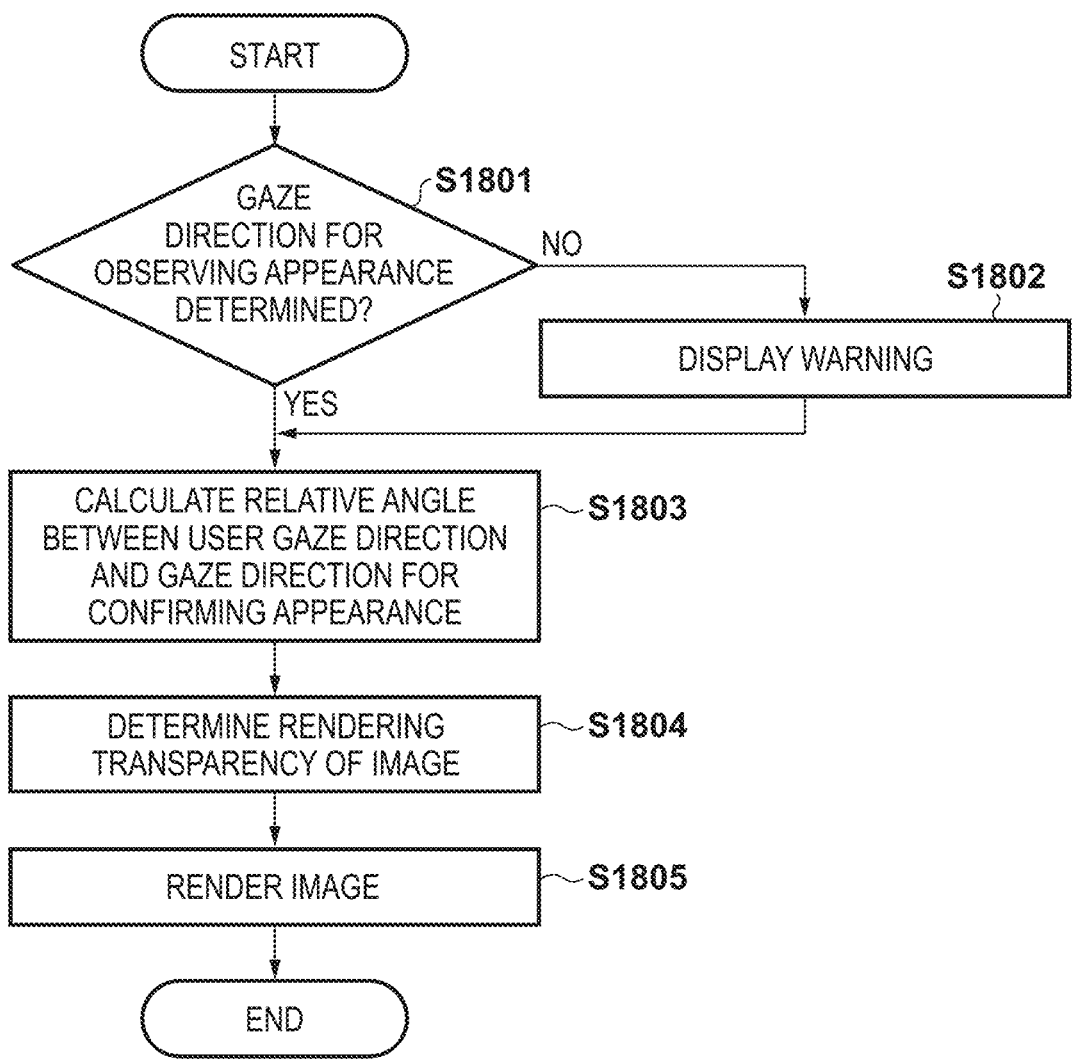
FIG. 18 is a flowchart of processing for rendering an image.

In S1612, the appearance observation gaze direction rendering unit 406 renders the image I2, which presents the gaze direction for observing appearance. The image I2 is configured to include at least one of the three-dimensional arrow model 1705 indicating a gaze direction for observing appearance, the two-dimensional plane model 1706 indicating a gaze direction for observing appearance, and the region-of-interest marker 1707 in FIG. 17. FIG. 18 is a flowchart for explaining a detailed processing flow of S1612. Hereinafter, a description will be given with reference to FIG. 18. Descriptions will be omitted for S1801, S1802, S1803, and S1804 as processing is the same as that of S901, S902, S903, and S905, respectively, described in the first embodiment.

In S1805, the image I2 is rendered with the rendering transparency determined in S1804. Specifically, processing in which as the user gaze direction, which is the gaze direction of the user observing the information processing apparatus 1, approaches the observation gaze direction that is suitable for observing the appearance of the target object the rendering transparency of at least one of the three-dimensional arrow model 1705 and the two-dimensional plane model 1706.

Regarding the three-dimensional arrow model 1705, a start point vi and an end point of of the arrow are represented using the center point (xc, yc, zc) of the region of interest, the length 1 of the side of the region of interest, the appearance observation gaze direction ($\theta_b$, $\varphi_b$). Here, the appearance observation gaze direction ($\theta_b$, $\varphi_b$) is obtained by converting the gaze direction for observing appearance calculated in S1608 into a polar angle and an azimuth angle in the three-dimensional polar coordinate system, whose polar angle and azimuth angle with respect to a directly upward (sky) direction are two angular coordinates, with the center point of the region of interest as the origin. Specifically, the start point and the end point of the arrow are determined as in the following equation.

[EQUATION 9]

$$v_i = (x_c + 10l\sin\theta_b\cos\varphi_b,\ y_c + 10l\sin\theta_b\sin\varphi_b,\ Z_c + 10l\cos\theta_b) \quad (9)$$

$$v_f = (x_c, y_c, z_c)$$

Each set of coordinates represents the x-coordinate, y-coordinate, and z-coordinate in the virtual three-dimensional coordinate in which the target object is present.

Further, regarding the two-dimensional plane model 1706 indicating the gaze direction for observing appearance, a plane represented by the following equation is rendered as a plane that passes the center point (xc, yc, zc) of the region of interest and is perpendicular to the appearance observation gaze direction ($\theta_b$, $\varphi_b$). The size is, for example, 20 times the length 1 of the side of the region of interest.

[EQUATION 10]

$$\sin\theta_b\cos\varphi_b(x-x_c)+\sin\theta_b\sin\varphi_b(y-y_c)+\cos\theta_b(z-z_c)=0 \quad (10)$$

Regarding the region-of-interest marker 1707, a square model representing the region of interest is displayed. The three-dimensional arrow model 1705, which indicates the gaze direction for observing appearance; the two-dimensional plane model 1706; and the region-of-interest marker 1707 are arranged so as to be superimposed on the virtual three-dimensional coordinates in which the target object exists and are rendered in consideration of the shielding relationship with the target object. In the present embodiment in which the user's eyes always directly face the display 304, this method for presenting the direction for observing appearance makes it possible to ascertain the direction for observing appearance more intuitively than the method for presenting the direction for observing appearance of the first embodiment.

The method for determining the model position and posture, which represent the gaze direction for observing appearance is not limited to the above-described method, and display may be performed using another position and posture so long as they are for presenting the gaze direction for observing appearance. This concludes the description of the processing flow of FIG. 18, and the description of the processing flow of FIG. 16 is returned to.

In S1613, the output image compositing unit 407 generates an image to be displayed on the display 304 of the information processing apparatus 1 by compositing the image I1, which has been rendered by the target object image rendering unit 405, and the image I2, which has been rendered by the appearance observation gaze direction rendering unit 406.

This concludes the description for the processing flow of FIG. 16.

Effect of Embodiment

As described above, the information processing apparatus according to the present embodiment calculates a gaze direction at which it is easily to visually recognize the unevenness of a target object having a three-dimensional shape from the environment map information and presents it to the user. As a result, the user can effectively confirm the appearance of the target object.

<Variation>

In the present embodiment, a gaze direction that is suitable for observing unevenness has been presented; however, a gaze direction that is suitable for observing another element of appearance may be displayed, and a plurality of gaze directions for observing appearance may be displayed at the same time or switched in accordance with the user's instruction.

According to the present invention, it is possible to easily ascertain a gaze direction that is suitable for observing the appearance of a target object. Therefore, the user can effectively confirm the appearance of an object without the work of changing their gaze direction in various ways for observation.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206264, filed Dec. 20, 2021, which is hereby incorporated by reference herein in its entirety.

What is claimed is:

1. An information processing apparatus comprising:
one or more processors that are configured to:
(1) obtain appearance information indicating an appearance of a target object;
(2) obtain illumination information for illuminating the target object;
(3) calculate, based on the appearance information and the illumination information, an observation direction for observing the appearance of the target object; and
(4) render at least one of (a) an arrow model indicating the same direction as the observation direction and (b) a plane model that is perpendicular to the observation direction.

2. The information processing apparatus according to claim 1, wherein the appearance information includes information of a diffuse reflection intensity and a specular reflection intensity.

3. The information processing apparatus according to claim 2, wherein in a case where the specular reflection intensity is greater than or equal to the diffuse reflection intensity, the one or more processors determine, as an observation direction for observing an unevenness of the target object, an observation direction in which a portion, in which there is a spatial frequency component that is greater than or equal to a threshold, of the illumination information is reflected in the target object.

4. The information processing apparatus according to claim 2, wherein in a case where the specular reflection intensity is smaller than the diffuse reflection intensity, the one or more processors determine, as an observation direction for observing an unevenness of the target object, an observation direction that is perpendicular to a light source included in the illumination information.

5. The information processing apparatus according to claim 2, wherein the one or more processors determine, as an observation direction for observing a color of the target object, an observation direction in which a portion, in which there is no illumination, of the illumination information is reflected in the target object.

6. The information processing apparatus according to claim 2, wherein the one or more processors determine, as an observation direction for observing a glossiness of the target object an observation direction in which a portion, in which there is illumination, of the illumination information is reflected in the target object.

7. The information processing apparatus according to claim 1, wherein the one or more processors render at least one of (1) information indicating an observation direction for observing a glossiness of the target object, (2) information indicating an observation direction for observing an unevenness of the target object, and (3) information indicating an observation direction for observing a color of the target object.

8. The information processing apparatus according to claim 1, wherein in a case where there is no observation direction for observing the appearance of the target object, the one or more processors display a warning.

9. The information processing apparatus according to claim 1, wherein the one or more processors obtain a user gaze direction, which is a gaze direction of a user observing the information processing apparatus.

10. The information processing apparatus according to claim 9, wherein the one or more processors determine, as the observation direction for observing the appearance of the target object, a direction whose angle that is formed with the user gaze direction is small.

11. The information processing apparatus according to claim 9, wherein the one or more processors render a three-dimensional hemisphere model in which;
   (1) a zenith portion of a spherical surface of the three-dimensional hemisphere model is indicated as the user gaze direction, and
   (2) the observation direction for observing the appearance of the target object is indicated as a point on the spherical surface as a direction that is relative to the user gaze direction.

12. The information processing apparatus according to claim 1, wherein the one or more processors are configured to:
   obtain shape information representing a shape of the target object; and
   designate a partial region of the shape information.

13. The information processing apparatus according to claim 12, wherein the one or more processors refer to the partial region to calculate the observation direction for observing the appearance of the target object.

14. The information processing apparatus according to claim 12, wherein the one or more processors render the partial region.

15. The information processing apparatus according to claim 1, wherein the closer a user gaze direction, which is a gaze direction of a user observing the information processing apparatus, is to the observation direction for observing the appearance of the target object, the one more processors reduce a rendering transparency of at least one of the arrow model and the plane model.

16. A method for controlling an information processing apparatus, the method comprising:
   obtaining appearance information indicating an appearance of a target object;
   obtaining illumination information for illuminating the target object;
   calculating, based on the appearance information and the illumination information, an observation direction for observing the appearance of the target object; and
   rendering at least one of (a) an arrow model indicating the same direction as the observation direction and (b) a plane model that is perpendicular to the observation direction.

17. A non-transitory computer-readable storage medium storing instructions that, when executed by a computer, cause the computer to perform a method for controlling an information processing apparatus, the method comprising:
   obtaining appearance information indicating an appearance of a target object;
   obtaining illumination information for illuminating the target object;
   calculating, based on the appearance information and the illumination information, an observation direction for observing the appearance of the target object; and
   rendering at least one of (a) an arrow model indicating the same direction as the observation direction and (b) a plane model that is perpendicular to the observation direction.

* * * * *